United States Patent
Whiteford et al.

(10) Patent No.: US 11,787,552 B2
(45) Date of Patent: Oct. 17, 2023

(54) ENGINE MOUNT SYSTEM AND ELEMENTS FOR REDUCED FORCE TRANSMISSION AND REDUCED STATIC MOTION

(71) Applicant: LORD Corporation, Cary, NC (US)

(72) Inventors: Gerald P. Whiteford, Waterford, PA (US); Jonathan Sacco, Erie, PA (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 18/087,209

(22) Filed: Dec. 22, 2022

(65) Prior Publication Data

US 2023/0127420 A1  Apr. 27, 2023

Related U.S. Application Data

(63) Continuation of application No. 16/929,794, filed on Jul. 15, 2020, now Pat. No. 11,542,023, which is a continuation of application No. PCT/US2019/013625, filed on Jan. 15, 2019.

(60) Provisional application No. 62/617,395, filed on Jan. 15, 2018.

(51) Int. Cl.
*B64D 27/26* (2006.01)
*F16F 15/023* (2006.01)

(52) U.S. Cl.
CPC ............ *B64D 27/26* (2013.01); *F16F 15/023* (2013.01); *B64D 2027/268* (2013.01)

(58) Field of Classification Search
CPC .. B64D 27/26; B64D 2027/268; F16F 15/023
See application file for complete search history.

(56) References Cited

U.S. PATENT DOCUMENTS

| 2,145,280 A | 1/1939 | Stitz |
| 2,437,574 A | 3/1948 | Watter et al. |
| 2,718,756 A | 9/1955 | Mcdowall |
| 3,006,587 A | 10/1961 | Jumelle et al. |
| 3,490,556 A | 1/1970 | Bennett et al. |

(Continued)

FOREIGN PATENT DOCUMENTS

| EP | 1 010 878 A2 | 6/2000 |
| EP | 1 607 330 A1 | 12/2005 |

(Continued)

OTHER PUBLICATIONS

Translation of FR2965876A1 (Year: 2012).*

(Continued)

*Primary Examiner* — Richard Green
*Assistant Examiner* — Steven J Shur
(74) *Attorney, Agent, or Firm* — KDW FIRM PLLC

(57) ABSTRACT

Compliant mounting systems, devices, and methods for mounting a vehicle engine to a vehicle structure or base include a top mount, a lower mount, a center trunnion mount, and an aft mount which are configured to react forces transmitted by the engine to the vehicle structure. Metallic and elastomeric elements can provide vibrational and force isolation characteristics. Stops (e.g., snubbing elements) allow for a specific range of motion before internal mount structures contact each other to act as a conventional hard mount. Fluid elements and compressible gas-filled spaces/bladders may be incorporated to provide fluid damping behaviors to complement the metallic and elastomeric elements.

19 Claims, 18 Drawing Sheets

(56) References Cited

U.S. PATENT DOCUMENTS

| | | | |
|---|---|---|---|
| 5,312,093 | A | 5/1994 | Smith et al. |
| 5,320,307 | A | 6/1994 | Spofford et al. |
| 5,687,948 | A | 11/1997 | Whiteford |
| 5,927,644 | A | 7/1999 | Ellis et al. |
| 6,095,456 | A | 8/2000 | Powell |
| 7,845,158 | B2 | 12/2010 | Udall |
| 8,020,831 | B2 | 9/2011 | Dron et al. |
| 8,118,251 | B2 | 2/2012 | Suciu et al. |
| 8,167,237 | B2 | 5/2012 | Suciu et al. |
| 8,256,707 | B2 | 9/2012 | Suciu et al. |
| 8,256,750 | B2 | 9/2012 | Cottrell et al. |
| 8,272,786 | B2 | 9/2012 | Cottrell et al. |
| 8,621,874 | B2 | 1/2014 | Watson et al. |
| 9,086,113 | B2 | 7/2015 | Bonnet et al. |
| 9,242,541 | B2 | 1/2016 | Kim |
| 10,197,128 | B2 | 2/2019 | Shahosseini et al. |
| 2012/0018575 | A1* | 1/2012 | Whiteford ............ B64D 27/20 244/54 |
| 2013/0292888 | A1 | 11/2013 | Hwang et al. |
| 2013/0306420 | A1 | 11/2013 | Smith et al. |
| 2016/0024958 | A1 | 1/2016 | Suciu et al. |
| 2018/0223944 | A1* | 8/2018 | Shahosseini ......... B60K 5/1208 |
| 2020/0346773 | A1 | 11/2020 | Whiteford et al. |

FOREIGN PATENT DOCUMENTS

| | | | |
|---|---|---|---|
| FR | 2 965876 A1 | 4/2012 | |
| FR | 2965876 A1 * | 4/2012 | ............ F16F 15/023 |
| GB | 6 09956 A | 10/1948 | |
| WO | WO 2008/103735 A2 | 8/2008 | |

OTHER PUBLICATIONS

International Search Report and Written Opinion for Application No. PCT/US2019/13625 dated Apr. 17, 2019.
Canadian Office Action for Application No. 3080178 dated Jul. 27, 2021.
Non-Final Office Action for U.S. Appl. No. 16/929,794 dated May 9, 2022.
Notice of Allowance for U.S. Appl. No. 16/929,794 dated Aug. 30, 2022.

* cited by examiner

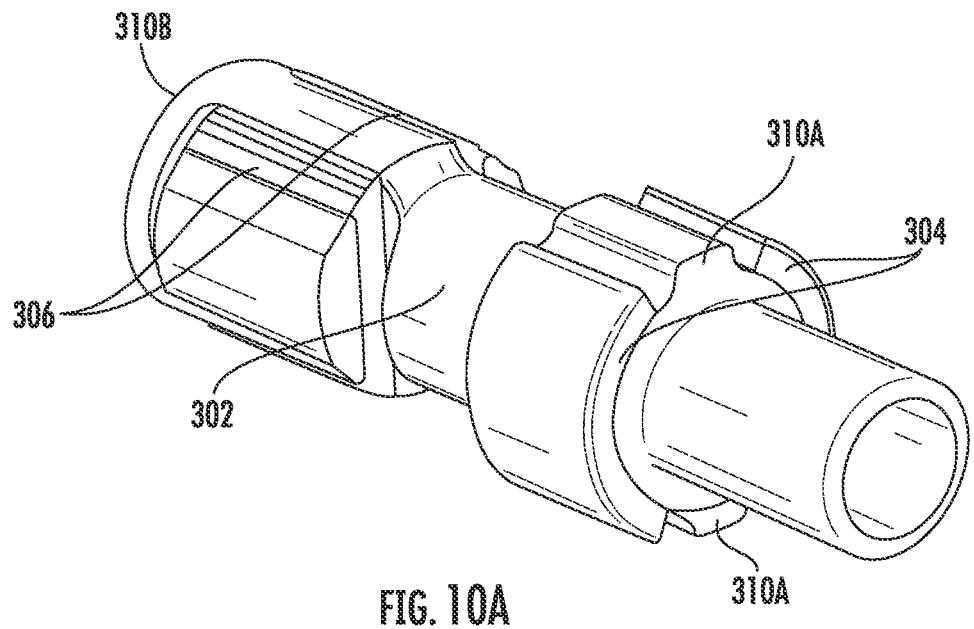
FIG. 10A
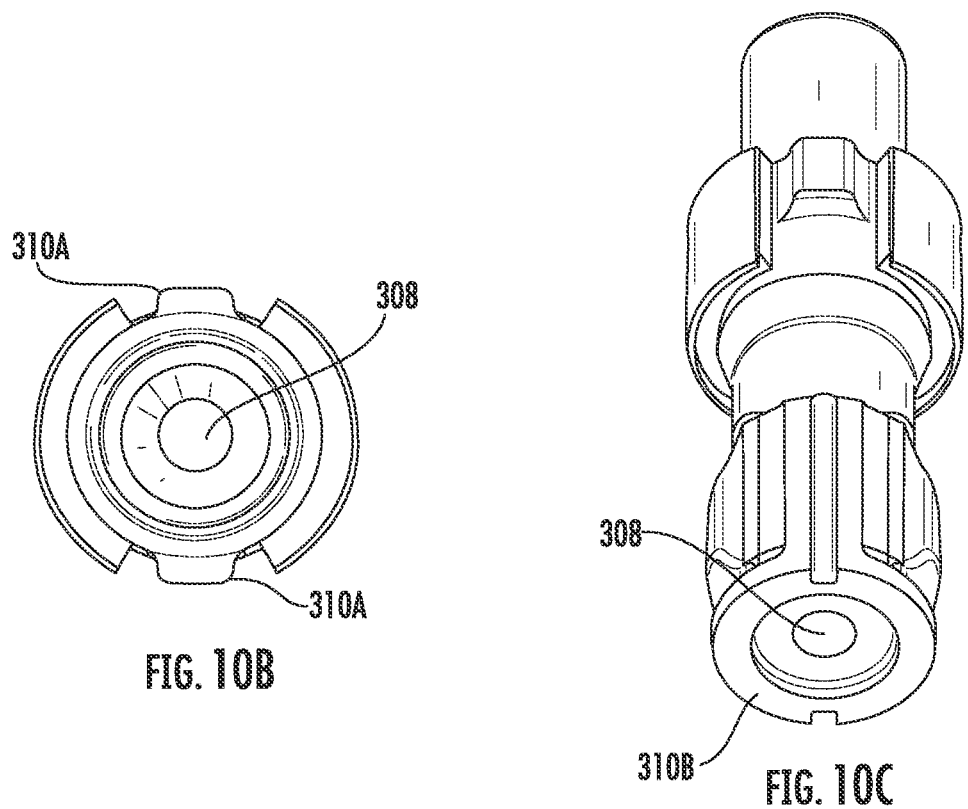
FIG. 10B
FIG. 10C

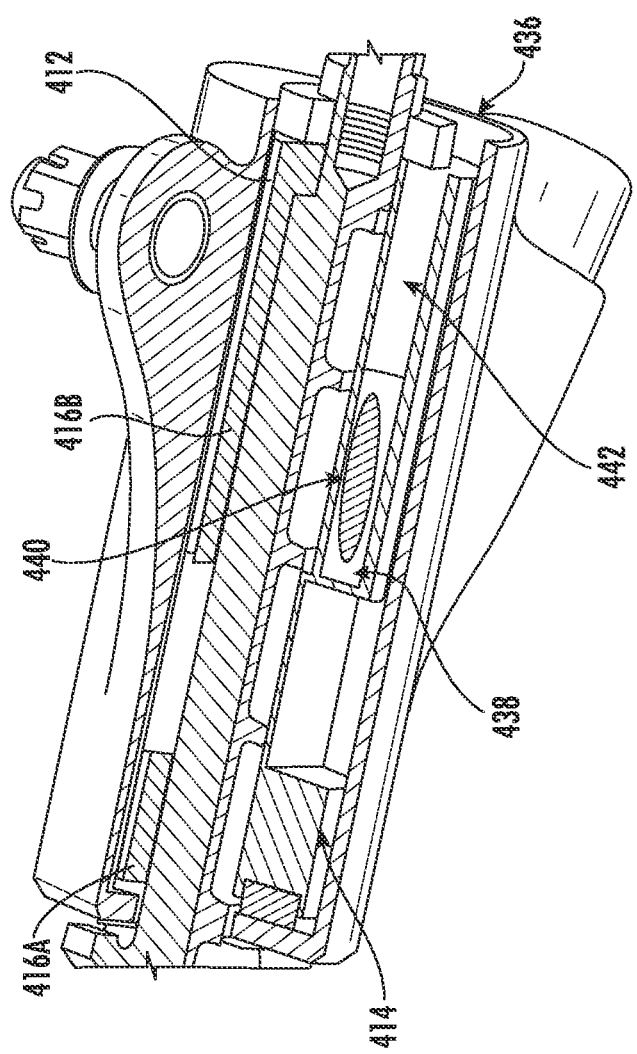

ENGINE MOUNT SYSTEM AND ELEMENTS FOR REDUCED FORCE TRANSMISSION AND REDUCED STATIC MOTION

CROSS-REFERENCE TO RELATED APPLICATIONS

This application is a continuation patent application of co-pending U.S. patent application Ser. No. 16/929,794, filed Jul. 15, 2020, which claims priority to International Patent Application No. PCT/US2019/013625, which was filed on Jan. 15, 2019, and to U.S. Provisional Patent Application Ser. No. 62/617,395, which was filed on Jan. 15, 2018, the disclosures of which are incorporated by reference herein in their entirety.

TECHNICAL FIELD

The subject matter disclosed herein relates to an engine mount system. In particular, the subject matter relates to engine mount systems as well as associated methods of use and manufacture that reduce force transmission and static motion between an engine and a base or a vehicle.

BACKGROUND

Modern vehicles continue to offer improved refinement and isolation for passengers from noises and vibrations generated by components of the vehicle during travel. This is especially important in applications for aircraft, in particular for small jets.

Compliant mount systems are often used to reduce force from engines or similar machines to a base or a vehicle. These mount systems can provide good reduction to vibration and force transmission to the vehicle but result in increased motion compared to a stiffer "hard" engine mounting system. This increased motion induced in such conventional compliant mounting systems must be controlled, traditionally requiring a design to make certain compromises in seeking to minimize the vibration, force, and motion transmission.

Conventional compliant mounts often incorporate elastomers because of their ability to compensate and control larger ranges of motion with softer spring rates. However, one disadvantage of elastomers is the tendency of such materials to take a compression set (e.g., the amount by which an elastomeric material fails to return to its original size after release from a constant compressive load) and/or to exhibit characteristics of creep (e.g., the time-dependent part of a strain resulting from stress) over time when these materials are loaded, thereby requiring additional accommodation for motion of the engine.

To minimize excess undesired motions, stops (e.g., snubbing elements) can be used within such compliant mounting systems. However, when stops are incorporated in conjunction with elastomers, the stops must be set to accommodate the set and/or creep of the elastomeric materials during the life of such a mounting system. This required additional motion control capability is necessary to ensure the mount system continues to operate over the expected life.

Furthermore, the incorporation of resonant fluid devices can be used to generate a reduction in the forces transmitted through a mount over a designed frequency range. Such a fluid mount is known in the art using elastomeric flexing elements to seal the fluid and avoid sliding seals.

Accordingly, it would be advantageous for improved compliant engine mounting systems which are able to reduce vibration and force transmission from an engine or such similar structure to a base or a vehicle without all of the drawbacks of the conventional compliant engine mount systems presently known.

SUMMARY

In one aspect, a mounting device for reacting loads from an engine of an aircraft to an aircraft structure along a longitudinal axis of the mounting device is provided. The mounting device has an upper link and a housing. The upper link comprising an upper bearing surface disposed along the longitudinal axis of the mounting device, along which loading occurs. The housing comprising a lower bearing surface and a center structure. The lower bearing surface is disposed along the longitudinal axis of the link device. The center structure is centrally disposed relative to the longitudinal axis. The center structure further comprises at least one compression stop configured to carry loads in compression and at least one tension stop configured to carry loads in tension. The upper link is configured to interlock within the center structure.

In another aspect, a top mount is provided for reacting tension loads from an engine of an aircraft to an aircraft structure along a longitudinal axis of the top mount. The top mount has an upper link, a flexing element, a fluid, and an inner member. The upper link having an upper bearing surface. The housing comprises a lower bearing surface and a center mount. The lower bearing is disposed along the longitudinal axis of the top mount. The center structure is centrally disposed relative to the longitudinal axis of the top mount. The center structure further comprising a compression stop configured to carry loads in compression and at least one tension stop configured to carry loads in tension. The upper link is configured to interlock within the center structure. The flexing element is in sealing contact with the housing; a fluid which fills, at least partially, a space within the flexing element and the housing. The fluid, which fills, at least partially, a cavity within the flexing element and the housing. The inner member having the cavity formed therein, the cavity having a gas-filled space/bladder therein. The loading of the top mount occurs along the longitudinal axis thereof.

In still another aspect, a lower mount is provided for reacting compression loads from an engine of an aircraft to an aircraft structure along a longitudinal axis of the lower mount. The lower mount comprising an upper link, a housing, a flexing element, a fluid, and an inner member. The upper link having an upper bearing surface. The housing comprising a lower bearing surface and a center structure. The lower bearing surface being disposed along the longitudinal axis of the lower mount. The center structure is centrally disposed relative to the longitudinal axis of the lower mount. The center structure further comprises a compression stop configured to carry loads in compression and at least one tension stop configured to carry loads in tension. The upper link is configured to interlock within the center structure. The flexing element in sealing contact with the housing. The fluid which fills, at least partially, a space within the flexing element and the housing. The inner member located within the cavity, the cavity having a gas-filled space/bladder therein. The loading of the lower mount occurs along the longitudinal axis thereof.

In yet another aspect, a center trunnion mount is provided for reacting loads from an engine of an aircraft to aircraft structure. The center trunnion mount has a pin, a pivot element, and an elastomeric compliance element. The pin is configured to be received within an engine bearing structure of the engine. The pivot element is disposed on a surface of the pin, the pivot element being configured to react the loads from the engine. The elastomeric compliance element is disposed inboard on the pin relative to the pivot element.

In still another aspect, an aft mound is provided for reacting loads from an engine of an aircraft to an aircraft structure. The aft mount comprises an inner lug, a housing, and an inboard elastomer package. The inboard elastomer package is configured to move laterally with the inner lug inside of the housing. The lateral movement of the inner lug and inboard elastomer package is bounded by a first position and a second position. The inboard elastomer package comprises an inner member configured to form a fluid cavity at an inboard end of the housing. The inner member is movable along a longitudinal axis of the housing to modify a volume of the fluid cavity. The lateral movement of the inner lug and inboard elastomer package pumps a fluid into or out of the fluid cavity to change a volume of a gas-filled space/bladder.

In one aspect, a compliant engine mount system for reacting loads from an engine of an aircraft to an aircraft structure. The compliant engine mount system comprising a top mount, a lower mount, and a center trunnion mount. The top mount has an upper link, a flexing element, a fluid, and an inner member. The upper link having an upper bearing surface. The housing comprises a lower bearing surface and a center mount. The lower bearing is disposed along the longitudinal axis of the top mount. The center structure is centrally disposed relative to the longitudinal axis of the top mount. The center structure further comprising a compression stop configured to carry loads in compression and at least one tension stop configured to carry loads in tension. The upper link is configured to interlock within the center structure. The flexing element is in sealing contact with the housing; a fluid which fills, at least partially, a space within the flexing element and the housing. The fluid, which fills, at least partially, a cavity within the flexing element and the housing. The inner member having the cavity formed therein, the cavity having a gas-filled space/bladder therein. The loading of the top mount occurs along the longitudinal axis thereof. The lower mount comprising an upper link, a housing, a flexing element, a fluid, and an inner member. The upper link having an upper bearing surface. The housing comprising a lower bearing surface and a center structure. The lower bearing surface being disposed along the longitudinal axis of the lower mount. The center structure is centrally disposed relative to the longitudinal axis of the lower mount. The center structure further comprises a compression stop configured to carry loads in compression and at least one tension stop configured to carry loads in tension. The upper link is configured to interlock within the center structure. The flexing element in sealing contact with the housing. The fluid which fills, at least partially, a space within the flexing element and the housing. The inner member located within the cavity, the cavity having a gas-filled space/bladder therein. The loading of the lower mount occurs along the longitudinal axis thereof. The center trunnion mount has a pin, a pivot element, and an elastomeric compliance element. The pin is configured to be received within an engine bearing structure of the engine. The pivot element is disposed on a surface of the pin, the pivot element being configured to react the loads from the engine. The elastomeric compliance element is disposed inboard on the pin relative to the pivot element.

A method of reacting loads from an engine of an aircraft to an aircraft structure is provided. The method comprises: applying a pre-load force to an upper link of an engine mount device; coupling the upper link to a flexing element; transmitting a load from the engine to a bearing surface of the engine mount device. When the load from the engine is greater than the pre-load force, the upper link is movable with respect to a housing of the engine mount device along a longitudinal axis of the engine mount device. A movement of the upper link relative to the housing is bounded by a distance between a first position and a second position and deforms the flexing element and pumps a fluid into or out of a cavity within the engine mount device to change a volume of a gas-filled space/bladder.

A method for reacting loads from an engine of an aircraft to an aircraft structure is provided. The method comprises: providing an engine bearing on the engine, the engine bearing having an engine bearing surface; inserting a pin at least partially within the engine bearing; and transmitting a load from the engine to the pin at the engine bearing surface. Lateral movement of the pin is bounded in an inboard direction along a longitudinal axis of the housing by a first position. When the load acts along a longitudinal axis of the pin, the pin moves substantially freely along the longitudinal axis of the housing. When the load acts transverse to the longitudinal axis of the pin, the load is reacted by a pivot element and an elastomeric compliance element.

A method for reacting loads from an engine of an aircraft to an aircraft structure is provided. The method comprises: coupling an inner lug to move with an inboard elastomer package of an engine mount device; coupling the inboard elastomer package to an inner surface of a housing of the engine mount device; and transmitting a load to the inner lug of the engine mount device. Lateral movement of the inner lug and the inboard elastomer package relative to the housing is bounded by a first position and a second position. When the load acts along a longitudinal axis of the housing, the inner lug and the inboard elastomer package move laterally and pump a fluid into or out of a fluid cavity within the engine mount device to change a volume of a gas-filled space/bladder. When the load acts transverse to the longitudinal axis of the housing, the load is reacted by the inboard elastomer package.

In a further aspect, a method for limiting the deflection of an engine mechanically to an aircraft structure of an aircraft is provided. The method comprising providing a mounting device having at least one compression stop (111, 211) configured to carry loads in compression and at least one tension stop (110, 210) configured to carry loads in tension, the mounting device further comprising: an upper link (102, 202) comprising an upper bearing surface (112A, 212A) disposed along the longitudinal axis of the mounting device, along which loading occurs; and a housing (104, 204) comprising a lower bearing surface (112B, 212B), which is disposed along the longitudinal axis of the mounting device, and a center structure (114, 214), which is centrally disposed relative to the longitudinal axis; wherein the center structure (114, 214) includes the at least one compression stop (111, 211) and the at least one tension stop (110, 210); wherein the upper link (102, 202) is configured to interlock within the center structure (114, 214); and reacting an operational load from the engine (4) with the mounting device.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

FIG. 10A is an isometric perspective view of a center trunnion pin according to an embodiment of the presently disclosed subject matter.

FIG. 10B is a front view of the center trunnion pin according to an embodiment of the presently disclosed subject matter.

FIG. 10C is an elevated front perspective view of the center trunnion pin according to an embodiment of the presently disclosed subject matter.

FIG. 16 is a cutaway view of an aft mount assembly according to an embodiment of the presently disclosed subject matter.

DETAILED DESCRIPTION

The presently disclosed subject matter addresses, for example, problems encountered in conventional aircraft engine mount systems by introducing systems, devices, methods of attachment, and methods of manufacture. These systems, devices, and methods provide a set of linkages, each of which are designed to react vibratory forces which would otherwise be transmitted from an engine into an aircraft. These systems, devices, and methods isolate the aircraft from these forces and vibrations generated by the engine during normal operation yet still provide for the transmission of abnormally large forces to the vehicle structure for abnormal operating conditions. In some embodiments, this system is provided with a set of linkages having mechanical, elastomeric, and/or fluidic damping components to dissipate forces typically transmitted from an engine to a vehicle. The present systems, devices, and methods allow an isolation of an aircraft from vibration and other forces typically generated while in motion but allow transmission of abnormally large magnitude forces to the vehicle structure when an abnormal operating condition occurs.

FIGS. 1A-16 illustrate various views, aspects, and/or features associated with compliant engine mounting devices, systems, and related methods of use and manufacture. In some embodiments, the compliant engine mounting devices, systems, and methods set forth herein are configured to isolate and prevent transmission of vibrations and movement of an engine to an aircraft structure. Devices, systems, and methods provided herein include one or more of a top mount 100, a lower mount 200, a center trunnion mount 300, and an aft mount 400.

Figure 1A:
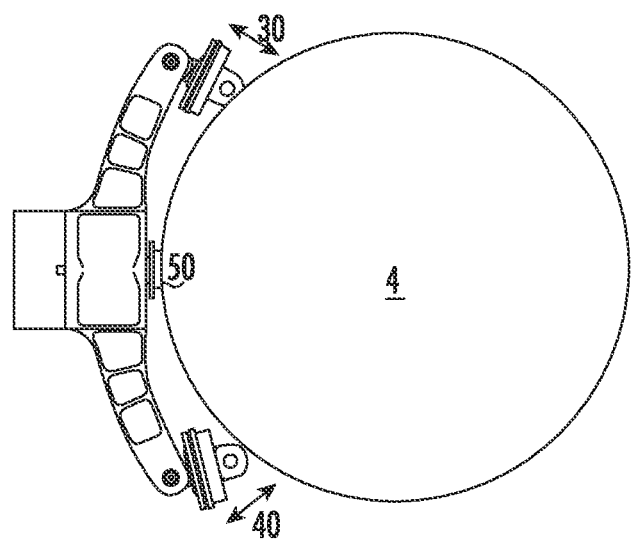
FIG. 1A is a schematic front view of a conventional aircraft engine mount system.
Figure 1B:
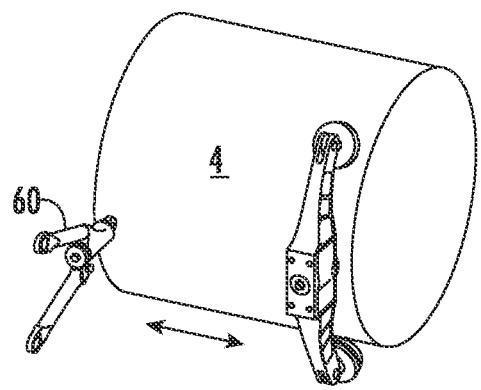
FIG. 1B is a schematic perspective view of the conventional aircraft engine mount system shown in FIG. 1A.
Figure 1C:
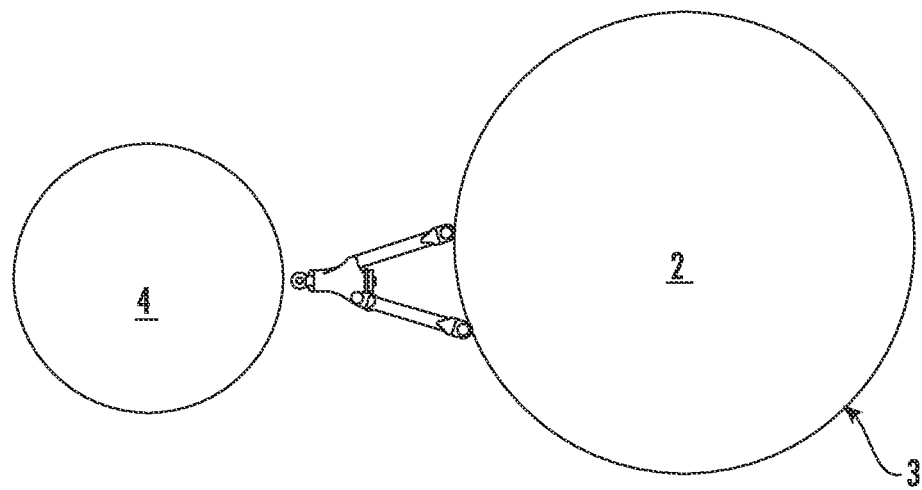
FIG. 1C is a schematic rear view of a conventional aircraft engine mount system shown in FIG. 1A.
Figure 2A:
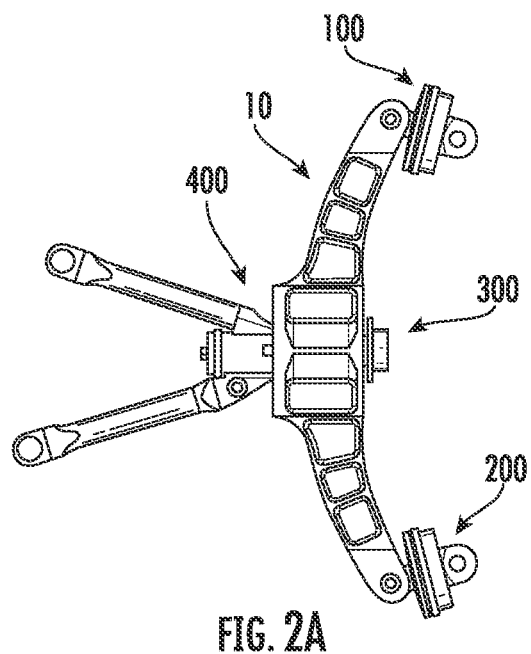
FIG. 2A is a front view of a compliant aircraft engine mount system according to an example embodiment.
Figure 2B:
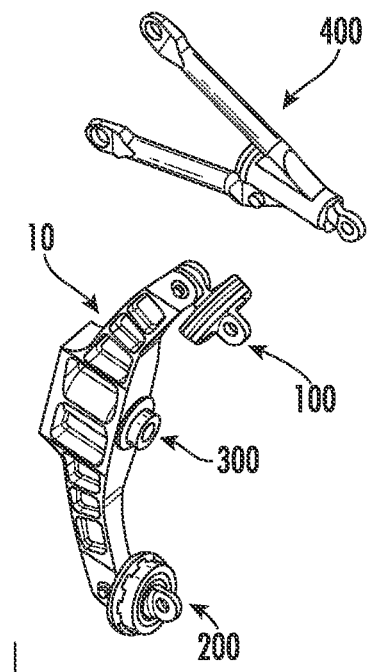
FIG. 2B is an isometric view of a compliant aircraft engine mount system according to an example embodiment.
Figure 2C:
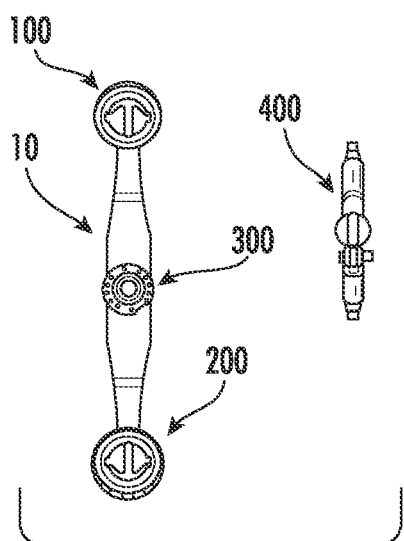
FIG. 2C is a side view of a compliant aircraft engine mount system according to an example embodiment.
Figure 2D:
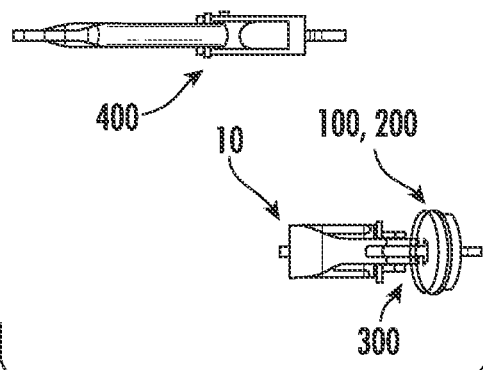
FIG. 2D is a top view of a compliant aircraft engine mount system according to an example embodiment.

Referring to FIGS. 1A-1C, a conventional aircraft engine mount system is shown. According to the typical aircraft mount system, an aircraft engine 4 is attached to an aircraft structure 3 of an aircraft 2 at two planes, referred to as the "fore" and "aft" planes. At the aft mounting plane, illustrated in FIGS. 1B and 1C, a conventional aft mount 60 is connected to engine 4 at a single attachment point in a scissor or A-frame style linkage arrangement reacts to vertical and lateral loads. Typically, conventional aft mount 60 is a hard link which is not compliant and does not isolate engine 4 from aircraft structure 3. At the fore mounting plane, illustrated in FIGS. 1A and 1B, engine 4 is mounted to the aircraft structure 3 by a conventional center trunnion mount 50, as well as by respective conventional top mount 30 and conventional lower mount 40. According to such a conventional engine mounting system, conventional center trunnion mount 50 reacts vertical and thrust loads but is free to slide in a lateral direction. The conventional top and lower mounts 30, 40 react only to loads along their respective longitudinal axes; these loads will therefore typically have both vertical and lateral components. According to conventional engine mount systems, the conventional top and lower mounts 30, 40 are typically "hard" links which are fixed and do not isolate the engine 4 from the aircraft structure 3. In normal gravity conditions, conventional top mount 30 primarily carries loads acting in tension and conventional lower mount 40 primarily carries loads acting in compression. In some conditions, such as during aircraft maneuver conditions, the conventional top and lower mounts 30, 40 need to be able to carry, or bear, both tension and compression loads.

FIGS. 2A-2D show an example embodiment of a compliant engine mount system, including a mounting bracket 10 to which a top mount 100, a lower mount 200, and a center trunnion mount 300 are attached on their respective proximal ends, wherein top mount 100, lower mount 200, and center trunnion mount 300 are configured to interface with and react loads from an engine at respective distal ends thereof. An aft mount 400 is located at a distance from mounting bracket 10 in the thrust direction of the engine. It is contemplated that mounting bracket 10, top mount 100, lower mount 200, and center trunnion mount 300 may be implemented in a system with a conventional (e.g., "hard") aft mount. It is further contemplated that aft mount 400 may be implemented with a set of one or more of conventional (e.g., "hard") top mounts, lower mounts, and center trunnion mounts. Other alternative embodiments will be understood by persons of ordinary skill in the art by referring to the following example embodiments and figures.

FIGS. 3A-5B are various views illustrating an embodiment of a top mount, generally designated 100, according to one embodiment for use in a compliant engine mounting system.

Figure 3A:
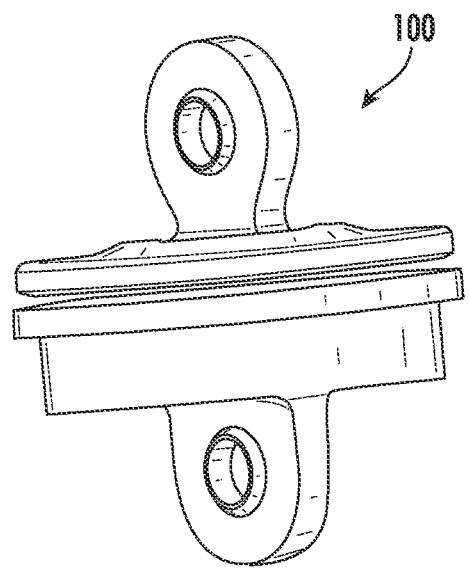
FIG. 3A is an isometric view of an upper link according to an embodiment of the presently disclosed subject matter.
Figure 3B:
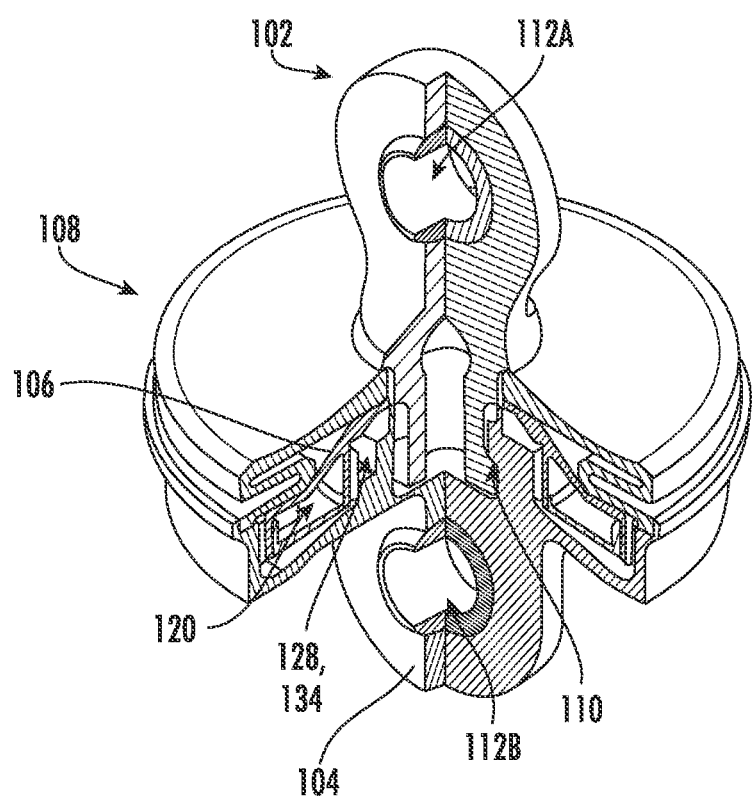
FIG. 3B is a cutaway perspective view of an upper link according to an embodiment of the presently disclosed subject matter.

Referring to FIGS. 3A and 3B, one embodiment of a top mount 100 is illustrated. Top mount 100 has an upper link 102 and a housing 104. As illustrated, upper link 102 has an upper bearing surface 112A which is used to attach top mount 102 to an aircraft engine(see generally, engine 4 in FIGS. 1A-1C) and housing 104 has a lower bearing surface 112B to attach housing 104 to an aircraft structure (see generally, aircraft structure 3 in FIGS. 1A-1C). Top mount 100 has an inner member 106 and a flexing element 108, which is preferably metallic, with fluid elements 120 being provided inside of inner member 106.

Figure 3C:
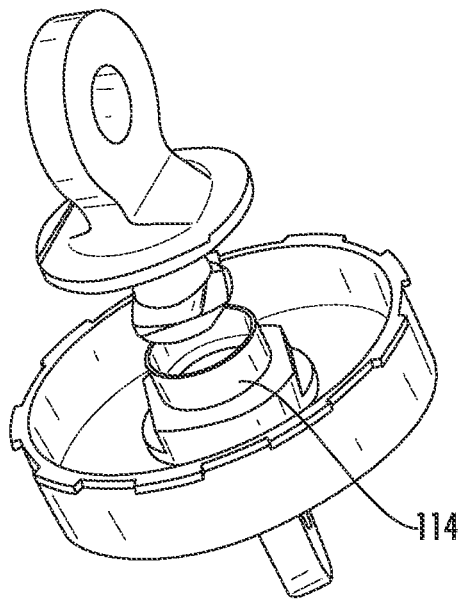
FIG. 3C is an exploded perspective view of view of an inner member and a housing.
Figure 3D:
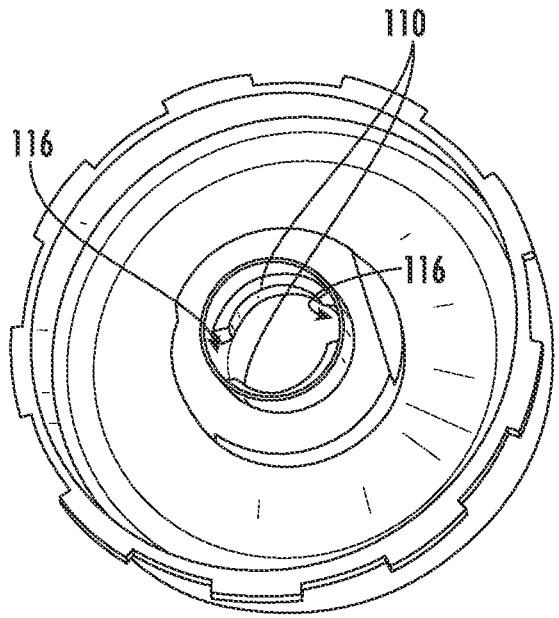
FIG. 3D is a perspective view of a housing.
Figure 3E:
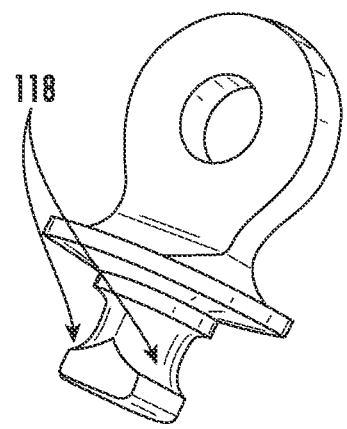
FIG. 3E is a perspective view of an inner member.
Figure 3F:
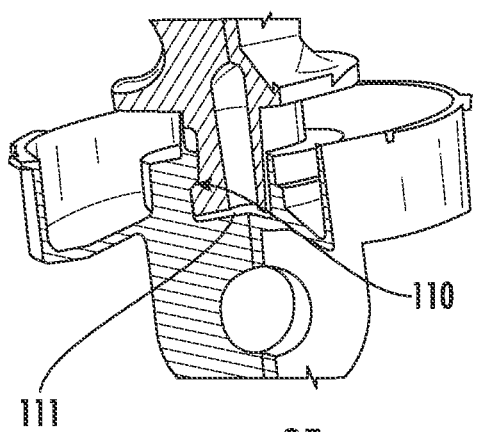
FIG. 3F is a cutaway perspective view of an inner member and housing in an installed position.

In the embodiment illustrated in FIGS. 3C-3F, top mount 100 includes one or more features which allow upper link 102 to be installed and retained within housing 104. Housing 104 has a center structure 114 which is centrally disposed about a longitudinal axis of top mount 100. Center structure 114 has a compression stop 111 which reacts compressive loads and tension stops 110 which react loads in tension. FIG. 3C illustrates insertion of upper link 102 into center structure 114 of housing 104. As illustrated, upper link 102 has lugs 118, which during assembly are inserted beyond the tension stops 110 and turned or rotated by a predetermined amount, for example, 90 degrees, so that the lugs 118 cannot be removed from within the center structure 114 without the lugs 118 being turned or rotated by the same predetermined amount, either in the same or an opposite direction. FIG. 3D illustrates slots 116 formed between tension stops 110 within center structure 114 of housing 104. Upper link 102 is configured to be inserted such that the lugs 118 thereof pass into and/or through slots 116 of center structure 114 of housing 104. Lugs 118 of upper link 102 are illustrated in FIGS. 3C and 3E. After lugs 118 are inserted beyond slots 116, upper link 102 is configured to be twisted, or rotated, by a predetermined rotation angle, e.g., approximately 90 degrees, into an installed position such that a bottom face of tension stops 110, which are shown here as being integral with housing 104, interface with upper flanges of lugs 118 to exert a retaining force to prevent removal of upper link 102 when in the installed position. FIG. 3F illustrates upper link 102 in the installed position with respect to the tension stops 110 of housing 104. While upper link 102 is in the installed position, upper link 102 is captive in housing 104. Once lugs 118 of upper link are installed within the center structure 114 of housing 104, the tension stops 110 and the compression stop 111 are positioned to engage within the center structure 114 and a strong central load core is thereby defined. Stop clearances between the lugs 118 and the respective tension stops 110 and compression stop 111 are set as required by the system motion limits and performance requirements. As noted elsewhere herein, the flexing element 108 pre-loads the upper link 102 so that the lugs 118 are biased against the compression stop 111 and the upper link will not move in the longitudinal direction away from the compression stop 111 until a tension force of sufficient magnitude to overcome the compression pre-load force is transmitted into the top mount 100. At a prescribed tension force, or load, having sufficient magnitude to overcome the compression pre-load force, the upper link 102 will move longitudinally away from housing 104 until the upper surfaces of the lugs 118 contact the tension stops 110 within the center structure 114 In some embodiments, the attachment points of top mount 100 on engine 4 and aircraft structure 3 are sufficiently rotationally fixed that upper link 102 and housing 104 are aligned and cannot rotate relative to each other beyond a negligible amount, thereby preventing unintended separation of upper link 102 from housing 104 during normal operation.

Figure 3G:
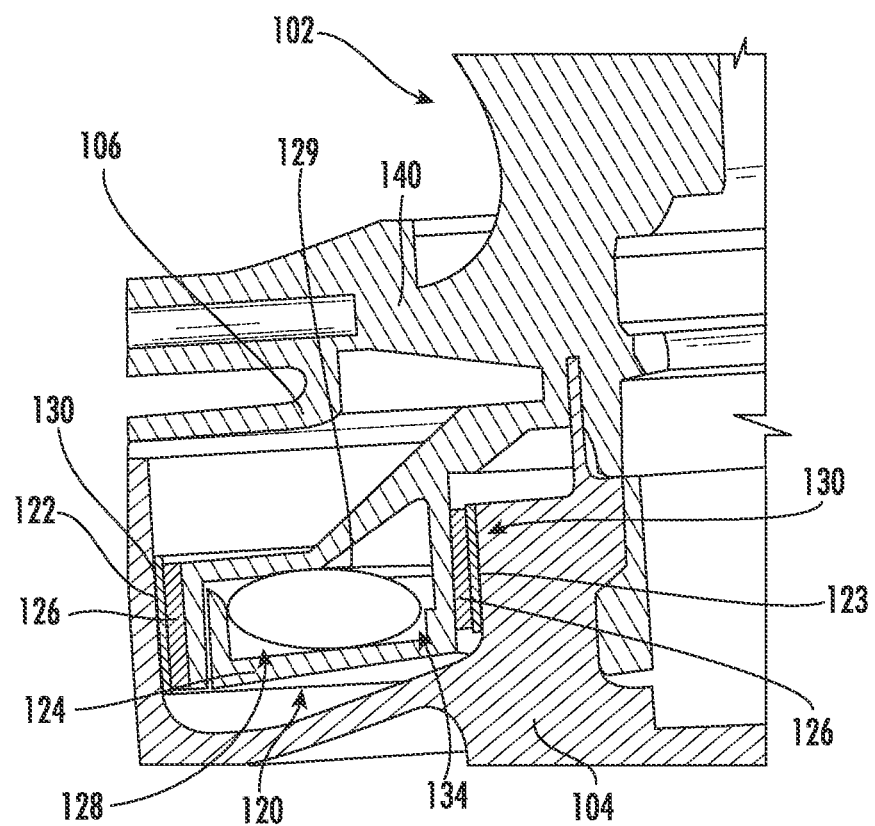
FIG. 3G is a cutaway view of an upper link according to an embodiment of the presently disclosed subject matter.
Figure 4A:
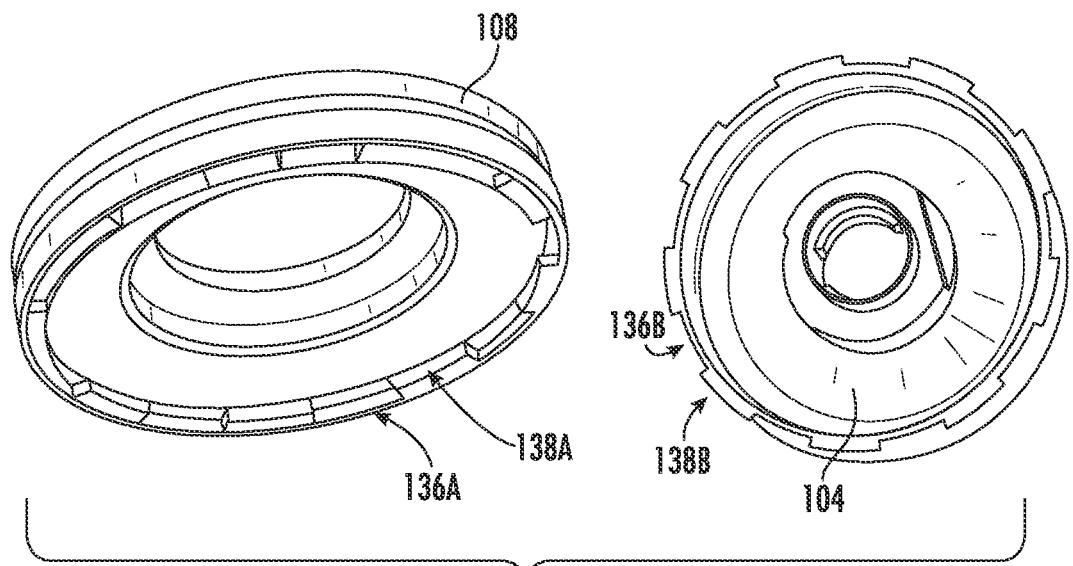
FIG. 4A is a perspective view of a flexing element and a housing.
Figure 4B:
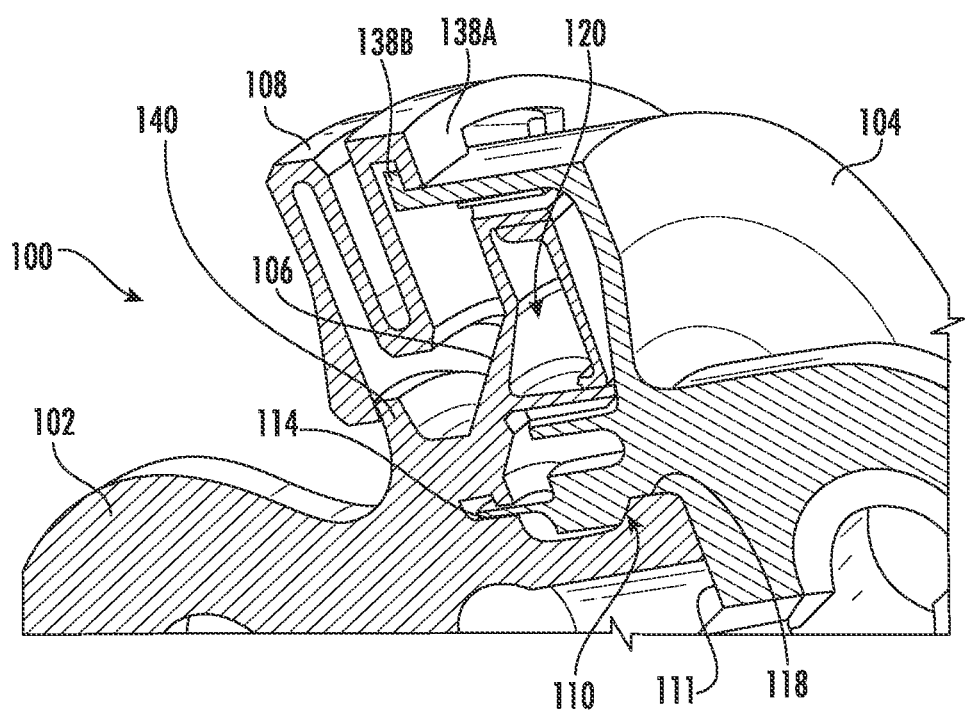
FIG. 4B is a cutaway perspective view of a flexing element and a housing in an assembled configuration.
Figure 5A:
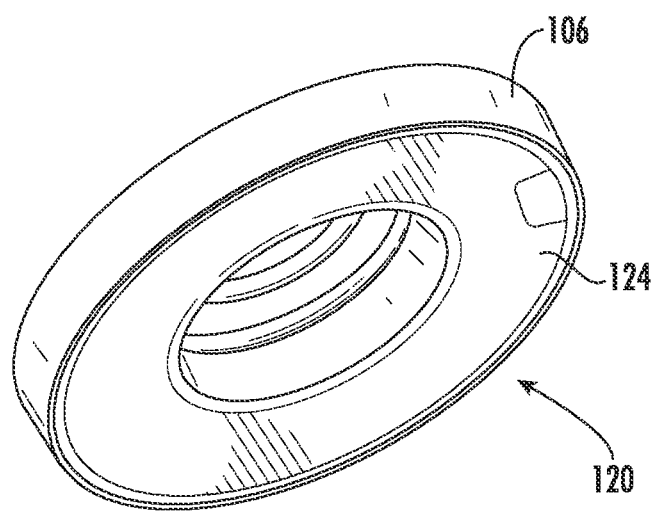
FIG. 5A is a perspective view of the inner member and central plate in an assembled configuration.
Figure 5B:
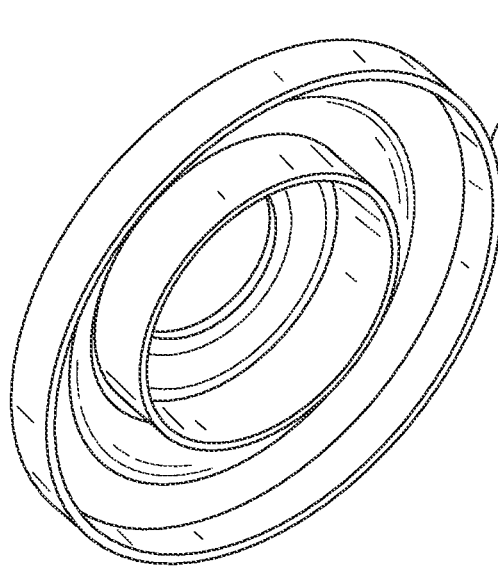
FIG. 5B is a cutaway perspective view of the inner member.
Figure 5C:
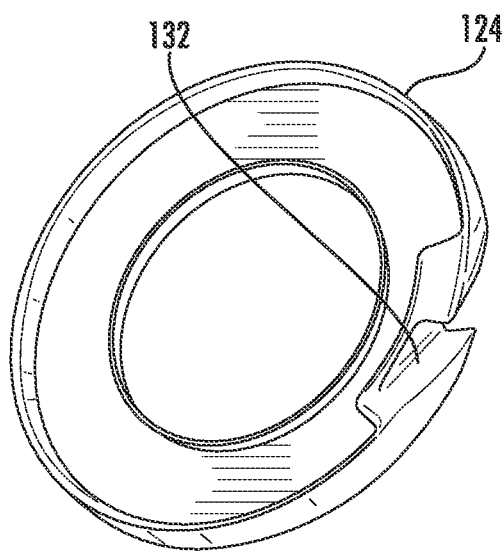
FIG. 5C is a perspective view of the central plate.
Figure 5D:
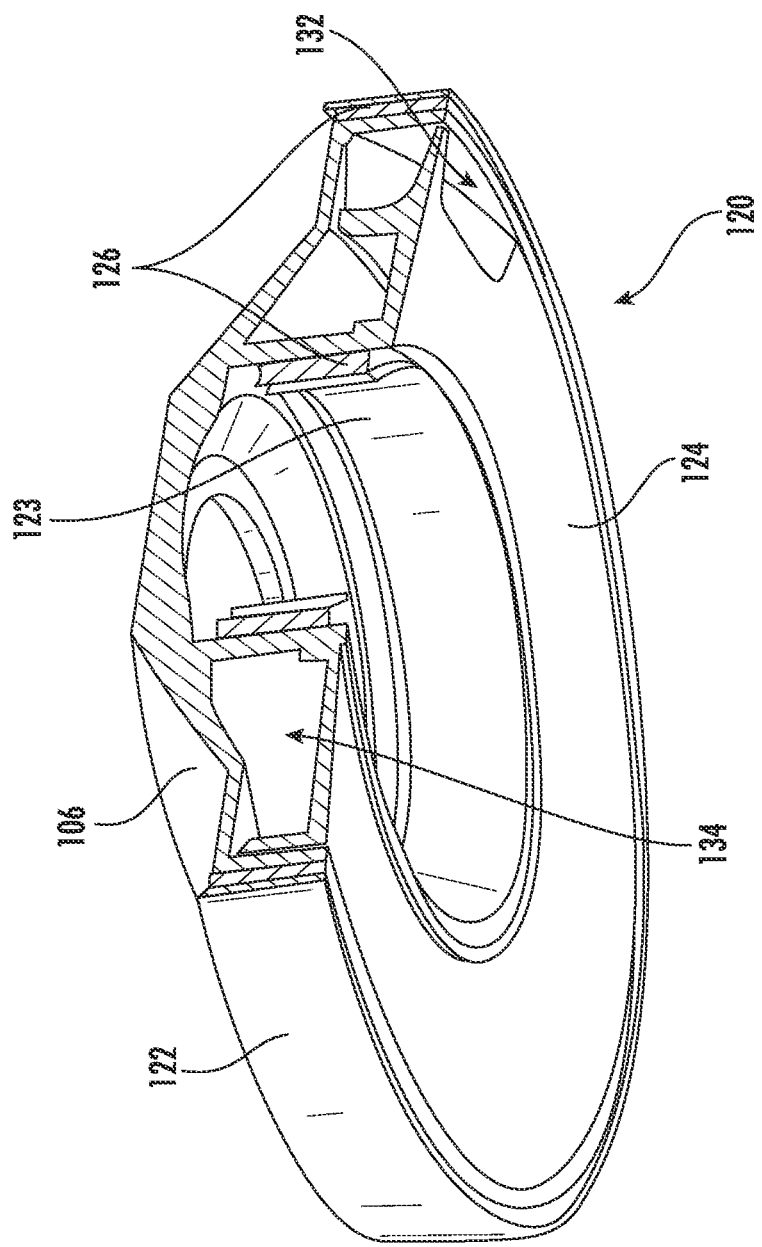
FIG. 5D is a sectional perspective view of the inner member and central plate in an assembled configuration.

Referring to FIG. 3G, a partial view of an assembled top mount 100 is shown. Inner member 106, which will be described in greater detail regarding FIGS. 5A-5D, is located in a recessed cavity of housing 104. Upper link 102 is located in housing 104, as described above. Flexing element 108 is on top of housing 104 and in contact, at least in portions, with an upper surface of the collar 140 of upper link 102. FIG. 4A illustrates installation slots 136A and loading lugs 138A, which are formed at an outer portion of flexing element 108, and corresponding installation slots 136B and loading lugs 138B formed in a cylindrical upper portion of housing 104. Installation slots 136A and loading lugs 138A of flexing element 108 are dimensioned circumferentially so as to be compatible with and accommodate passage therethrough of loading lugs 138B and installation slots 136B, respectively, of housing 104. Before installation, the loading lugs 138A of flexing element 108 are rotationally oriented to be substantially co-located with corresponding installation slots 136B of housing 104. In the installed position, installation slots 136A and loading lugs 138A of flexing element 108 are beyond a plane defined by loading lugs 138B and are substantially aligned with loading lugs 138B and installation slots 136B of housing 104, thus preventing separation of flexing element 108 and housing 104. During installation, flexing element 108 and/or housing 104 are rotated with respect to each other in order to lock flexing element 108 to housing 104, at least in a direction of extension. Loading lugs 138A and 138B may be one of many shapes, including compatible tapering profiles, such that rotation of flexing element 108 relative to housing 104 causes the tapered respective loading lugs 138A and 138B to exert a greater retention force as the degree of rotation is increased and also to aid in preventing over-rotation of flexing element 108 with respect to housing 104, which may result in the loading lugs 138A and 138B being inadvertently only partially engaged. FIG. 4B illustrates flexing element 108 and housing 104 in a fully engaged position, with the respective loading lugs 138A and 138B fully engaged against each other.

FIG. 4B also illustrates an inner circumferential edge of the upper surface of the flexing element 108 overlaps collar 140 of upper link 102 in the respective installed positions. FIG. 4B illustrates the upper link 102 in the installed and clocked, or rotated, position. The number of lugs 118 can vary depending on operational parameters, including, for example, the forces being transmitted, the desired amount of rotary motion to move the upper link 102 into the clocked position, and the like. In some embodiments, this overlap creates an interaction between flexing element 108 and collar 140 of upper link 102, whereby flexing element 108 applies a longitudinally oriented compressive force which provides an initial pre-load compressive force on the upper link 102, such that lugs 118 of upper link 102 are fully recessed and seated against compression stop 111 of center structure 114 when no tensile force is applied to top mount 100. In some embodiments, this initial pre-load compressive force ensures that no longitudinal displacement of upper link 102 occurs with respect to housing 104 until the initial pre-load compressive force is overcome by a tensile force (e.g., a tensile force exerted by engine 4) being applied to top mount 100.

According to this embodiment, once the initial pre-load compressive force is overcome in tension, upper link 102 and housing 104 are capable of longitudinal displacement over a defined range so as to isolate vibrational inputs to upper link from being translated directly into housing 104. The initial pre-load compressive force provided by the flexing element 108 is the minimum compressive load of the operational subset described hereinbelow. In some embodiments, until this initial pre-load compressive force is overcome, top mount 100 acts as a hard mount, at least with respect to the ability to isolate longitudinal deflections and vibrational inputs received by upper link 102 from being transmitted to housing 104 by direct contact therebetween, since lugs 118 of upper link 102 will be in direct contact with compression stop 111 of housing 104 unless and/or until a tensile force greater than the initial pre-load compressive force is transmitted to top mount 100. The aforementioned defined range is dependent upon the engine mount stiffness and allowable motions for the engine. For example, an engine mount system may be sized to operate under of 1 G±0.5 G with engine thrust at idle up to and including climb levels, wherein the G in the 1 G indicates the multiplier of the gravitational force. The pre-load of the engine mount system is set to enable the aforementioned operating condition. Importantly, the operational load of 1 G±0.5 G can be any design value selected by the engine mount designer, aircraft designer, and/or the engine designer. For example, it could be set at 10 G±5 G or more. The positions and distances between the tension and compression stops 110, 111 are set so that under a subset of the total operational load envelope, which constitutes loading for a majority (i.e., more than 50% of occasions) of the operational flight time of the aircraft, the engine mount(s) (e.g., top mount 100) provide isolation. However, the load and distance shown in the example embodiment vary for each engine and type of aircraft due to engine size, thrust, and aircraft structure and mount stiffness. The advantage of this system is isolation between the engine and the aircraft for a majority of the aircraft operation without the need to accommodate motions associated with infrequent loading conditions. Returning to the example embodiment, tension stops 110 interact with (e.g., directly contact) lugs 118 when tensile forces above a predetermined threshold are received by the top mount (e.g., at the upper link 102) to prevent excessive longitudinal displacement of upper link 102 away from housing 104, thereby preventing top mount 100 from being damaged by such inputs, such as by flexing element 108 undergoing plastic deformation rather than elastic deformation. The predetermined threshold is the predetermined tensile forces that generate motions outside of the aforementioned defined range. It is load outside of the subset of operational load(s) or load(s) greater than the load experienced for the majority (i.e., more than 50% of occasions) of the aircraft's operational life. When a tensile force above the predetermined threshold is experienced and the lugs 118 come into contact with tension stops 110, top mount 100 ceases behaving as a compliant isolating engine mount and instead behaves similarly to a conventional hard mount with minimal compliant characteristics, because upper link 102 and housing 104 are in direct contact (e.g., through tension stops 110) when such abnormally large tensile forces are applied. Abnormally large tensile forces are those forces greater than the predetermined threshold.

Regarding the fluid elements illustrated in FIGS. 3A-5D, outer cylinder members 122 form a seal 130 between outer cylinder members 122 and housing 104. The seal 130 is formed by bonding, using gaskets, using O-rings, press fitting, and other known techniques to ensure a fluid-tight seal between two elements. In some embodiments, inner member 106 is attached to upper link 102 such that, when upper link 102 moves, inner member 106 moves relative to housing 104. In some embodiments, two cylindrical elastomer sections 126 are sealed to inner member 106 on the inner and outer radial sides of the inner member 106, as illustrated in FIG. 3G. In some embodiments, outer cylinder member 122 and inner cylinder member 123 are sealed to the respective elastomeric sections 126, for example, at seals 130 illustrated in FIG. 3G. Similar seals may be present in the embodiment illustrated in FIGS. 7A and 7B. Central plate 124 is housed at least partially within inner member 106, thereby forming a cavity 134 therein with a fluid passage 132, the combination of which forms a fluid pathway. An inner gas-filled space 128 is located inside cavity 134. This inner gas-filled space 128 has a comparatively soft volumetric stiffness and allows for tuning the inertial fluid effects of top mount 100 as well as allowing for thermal compensation (e.g., from expansion and contraction due to changes in operating temperature of the engine mount). Inner gas-filled space 128 may be a pocket of a compressible gas filling a portion of cavity 134 as illustrated in FIGS. 3B, 3G, 4B and 5D or, in the alternative, an inner gas-filled bladder 129 may be positioned within cavity 134 as illustrated in FIG. 3G. For simplicity, the reference to inner gas-filled space 128 inner gas-filled bladder 129 are referred to as inner filled gas-filled space/bladder 128, 129.

Referring to FIGS. 3B-5D, the top mount 100 is filled with fluid in cavity 134 around inner gas-filled space/bladder 128, 129 and also in the lower section of housing 104. The fluid is contained in the housing space below the inner member 106 and is bounded by the inner elastomer section 126 against the housing 104 and the outer elastomer layer 126 against the housing 104. It is preferred that substantially all air be evacuated from within top mount 100 so that, other than inner gas-filled space/bladder 128, 129, the entire internal volume of top mount 100 is occupied by fluid. When lugs 118 are no longer contacting either the tension stop 110 or the compression stop 111, the motion of upper link 102 relative to housing 104 causes fluid to be pumped along a path defined by the housing 104 in the area below inner member 106, fluid passage 132, and into cavity 134 within inner member 106. When upper link 102 moves towards housing 104, fluid is pumped from an area of housing 104 outside of inner member 106 into cavity 134 via fluid passage 132, thereby compressing inner gas-filled space/bladder 128, 129. When the upper link moves away from housing 104, fluid pressure decreases and the gas-filled space/bladder 128, 129 expands, thereby pumping fluid out of cavity 134 by fluid passage 132 and into housing 104 outside of inner member 106. The dimensions of the fluid passage 132, the elastomer sections 126, and the volume and pressure of the gas within inner gas-filled space/bladder 128, 129 coupled with the spring rate of flexing element 108 allows for the fluid inertial effects to be tuned, thereby allowing for design of a "notch" in the force-transfer function over a desired frequency range. These primarily include the cross-sectional area of the inertia track, track length, and inlet and outlet dimensions. The very low damping in flexing element 108 enables even deeper "notch" effects than what is possible with conventional elastomer-only fluid mounts. Metals provide very low levels of damping compared to elastomers. The use of very low damping is thought to be similar a common metal spring. Very low damping using metals is advantageous in comparison to fluid-filled mounts where elastomers are used as the primary spring element, which provide higher levels of damping than is possible using a metal spring. For example, normal spring elements from metal would have damping of 1% or less, whereas elastomers typically would have more than 5% damping.

As illustrated in FIG. 3D two tension stops 110 are engaged by a corresponding number of (e.g., a same number of) lugs 118 of upper link 102 through rotation. However, any number of tension stops 110 can be used without deviating from the scope of the subject matter disclosed herein.

Figure 6A:
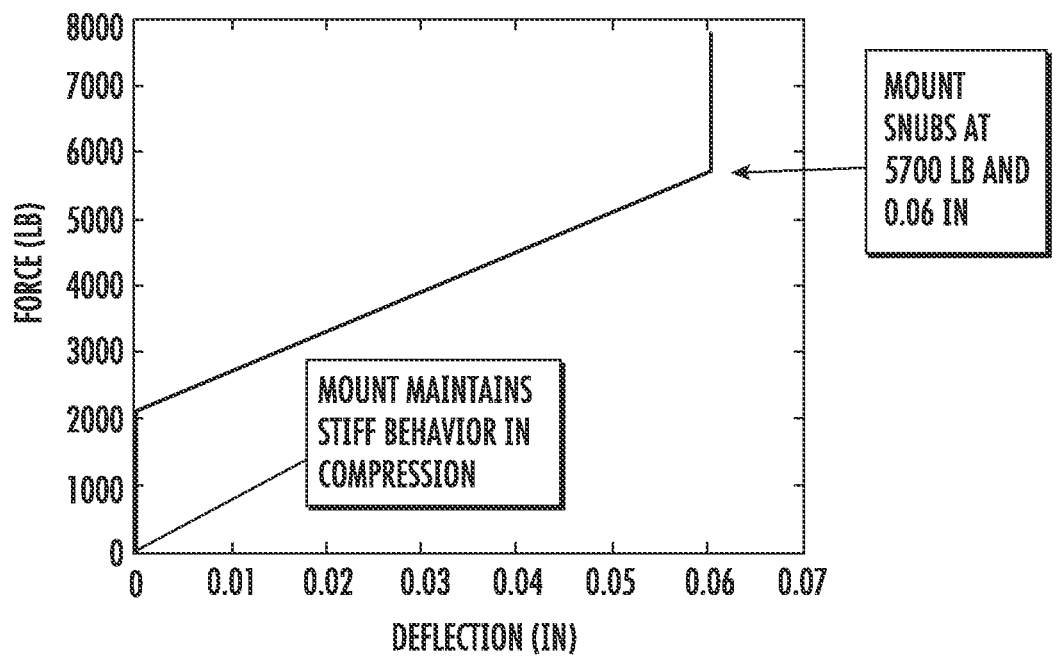
FIG. 6A is a chart of force versus deflection for a top link according to an embodiment.

FIG. 6A illustrates a force versus deflection curve for a top mount 100 according to one example embodiment. In this illustration, upper link 102 does not undergo any deflection until the initial pre-load compressive force is overcome by a tensile force of magnitude greater than the pre-load compressive force. As such, when a tensile force that is less than or equal to the pre-load compressive force is received by the top mount 100 (e.g., at upper link 102), lugs 118 remain in contact with compression stop 111 of housing 104 and will be spaced apart from tension stops 110 by a maximum amount, or distance. According to this example embodiment, when a tensile force greater than an upper threshold tensile load, e.g., the maximum subset of the aforementioned operational loads, is received by top mount 100, upper link 102 contacts tension stop 110 and cannot undergo any more deflection. As such, for forces less than the pre-load compressive force and greater than an upper threshold tensile load, the top mount 100 in this example embodiment will behave as a hard mount, with minimal compliance (e.g., vibration and/or noise isolation) characteristics. However, when upper link 102 receives a tensile force, or load, that is between the pre-load compressive force and the upper threshold tensile force, upper link 102 is "free" or "floats" within the center structure 114 between the compression stop 111 and the tension stops 110 to allow longitudinal deflection of the lugs 118 of upper link 102 relative to and within the center structure 114 of housing 104, this longitudinal deflection being commensurate with (e.g., proportional to) the magnitude of the tensile force being received by, or transmitted to, the top mount 100 (e.g., at upper link 102). It is in this "free" or "floating" deflection range wherein top mount 100 acts as a compliant engine mount to isolate a supporting structure, such as the aircraft structure 3 in FIGS. 1A-1C, from forces, loads, vibrations, and the like coming from a supported structure, such as engine 4 in FIGS. 1A-1C.

Figure 7A:
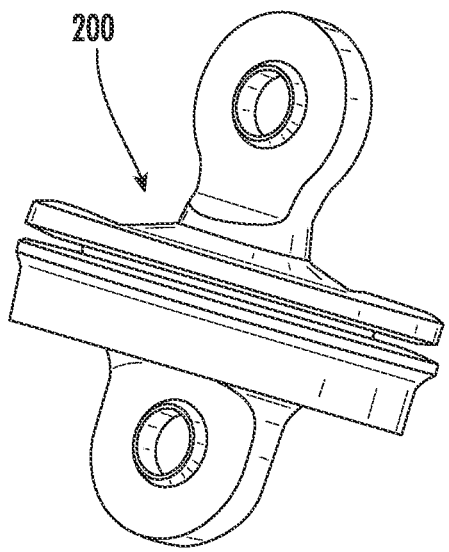
FIG. 7A is a perspective view of a lower mount according to an embodiment of the presently disclosed subject matter.
Figure 7B:
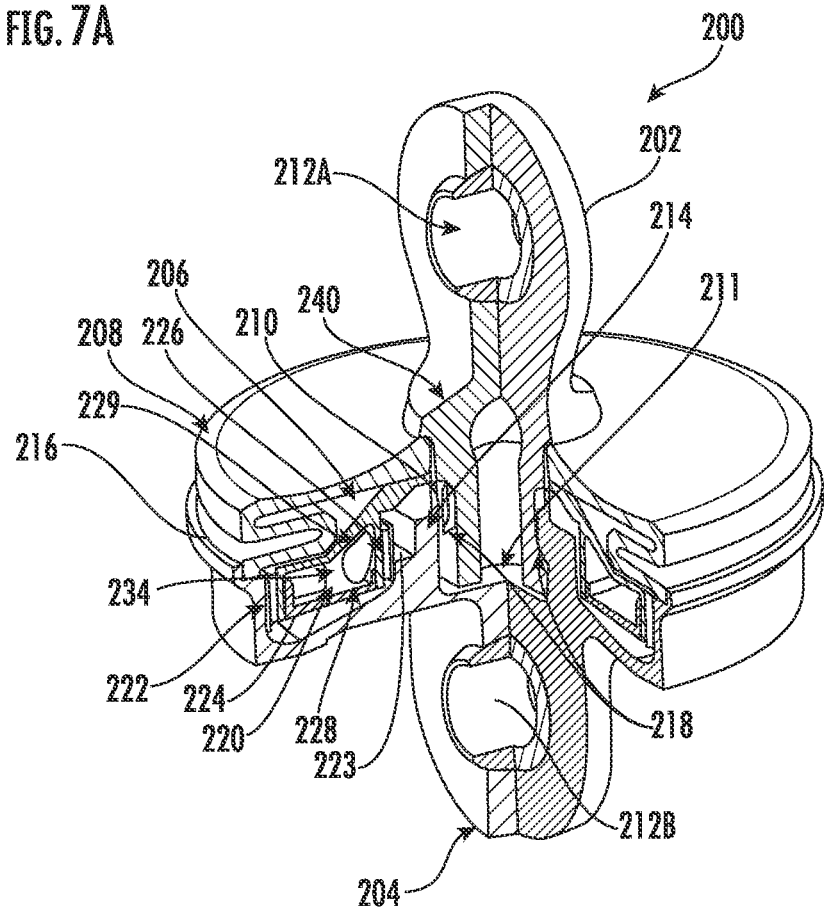
FIG. 7B is a cutaway perspective view of a lower mount according to an embodiment of the presently disclosed subject matter.

Referring to FIGS. 7A and 7B, an example embodiment of a lower mount 200 is illustrated. Similar to top mount 100, lower mount 200 has upper link 202, housing 204, flexing element 208, inner member 206, tension stops 210, upper and lower bearing surfaces 212A and 212B, and fluid elements 220. In some embodiments, upper link 202 is located within, at least partially, housing 204 substantially similarly in lower mount 200 as was described for top mount 100. Lugs 218 of upper link 202 are located, in an installed position, within a center structure 214 of housing 204 and beyond a plane defined by tension stops 210, which are shown as being integrally formed therein. Similar to top mount 100, flexing element 208 is preferably metallic. Unlike in top mount 100, however, upper link 202 has a collar 240 which is located on top of, and which is configured to interface with, a top surface of flexing element 208 when upper link 202 is in the installed position. In some embodiments, flexing element 208 and housing 204 do not have any loading lugs or installation slots as is shown for top mount 100. The reason for this is because collar 240 of upper link 202 applies a compressive load to flexing element 208 when upper link and flexing element 208 are in an installed position with respect to housing 204. In this arrangement, inner member 206 is captive with respect to and attached to upper link 202, such that longitudinal deflection of upper link 202 relative to housing 204 generates a corresponding longitudinal deflection of the same magnitude by inner member 206. In some embodiments, flexing element 208 and housing 204 only need to have compatible flange structures where they meet so as to transmit compressive loads from upper link 202 to housing 204. As in the upper link 202 the fluid space is only in the housing 204 and is bounded by the seal of the inner elastomer 226 to the housing 204 and the outer elastomer 222 to the housing 204. Flexing element 208 can be, but does not necessarily need to be, sealed to housing 204.

In some embodiments, upper link 202 is captive and thereby is configured to hold flexing element 208 and inner member 206 in a captive manner by their interaction with collar 240. In this embodiment, flexing element 208 exerts a tensile force oriented along the longitudinal axis of lower mount 200 against upper link 202 in the direction from housing 204 towards upper link 202. This tensile force acting on upper link 202 by flexing element 208 causes upper link 202 to be initially pre-loaded in tension with respect to housing 204. This pre-loading tensile force causes lugs 218 of upper link 202 to be in contact with tension stops 210 when a compressive force less than the pre-load tensile force is transmitted to lower mount 200. The pre-load tensile force is a subset of the total operational load envelope, which constitutes loading for a majority (i.e., more than 50% of occasions) of the operational flight time of the aircraft, the engine mounts provide isolation. As discussed above in regard to the pre-load compressive force, for the pre-load tensile force the load and distance in the example vary for each engine and type of aircraft due to engine size, thrust, and aircraft structure and mount stiffness.

Figure 6B:
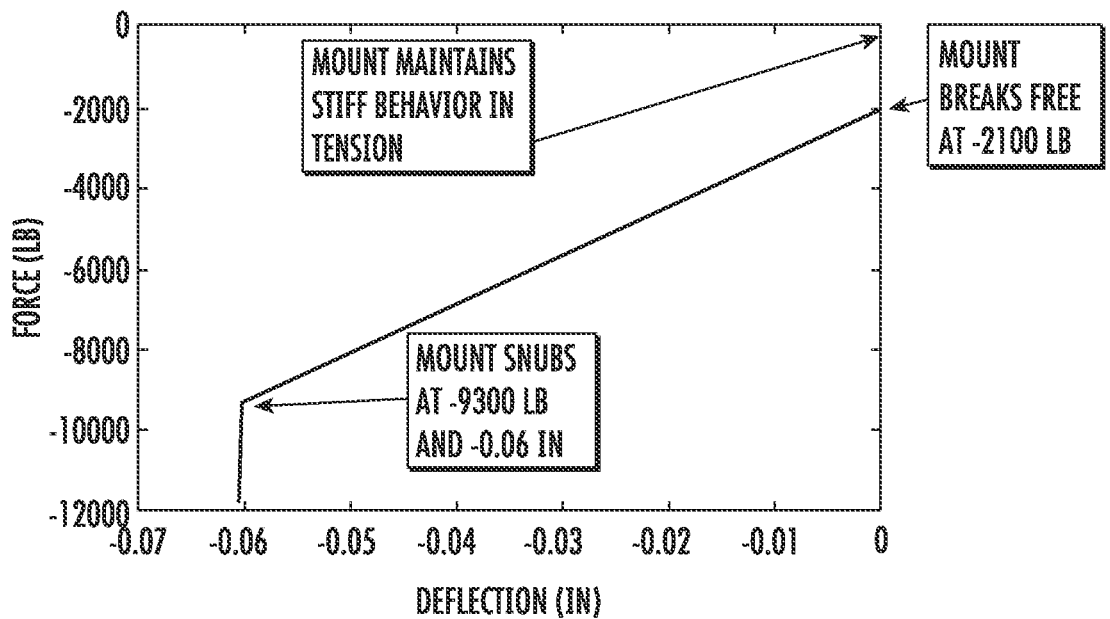
FIG. 6B is a graph of force versus deflection for a lower mount according to an embodiment.

Referring to a non-limiting example for a specific test case in FIGS. 6A and 6B, FIG. 6B provides an example force versus deflection curve for lower mount 200 according to one embodiment. Unlike in FIG. 6A, which showed tensile forces being applied and a corresponding deflection of upper link 102 away from housing 104 as both being positive values, FIG. 6B shows compressive forces and the corresponding deflection of upper link 202 towards housing 204 as (e.g., as the magnitude of the compressive force increases), both being negative values. Just as in FIG. 6A, lower mount 200 is provided with a pre-load force, but in tension instead of compression. As such, when a compressive force of less than the pre-load tensile force is received by lower mount 200, upper link 202 does not move because the compressive force received is not sufficient to counteract the pre-load tensile force. However, in embodiments where the tension stops 210 are omitted, the upper link 202 would move towards the housing 204 upon receiving a compressive force of any magnitude. Also, according to the example illustrated in FIG. 6B, lower mount 200 is designed to have a maximum possible deflection, at which lugs 218 of upper link 202 contact the compression stop 211 of housing 204 and cannot move any further in the direction towards housing 204, since lugs 218 of upper link 202 will be in direct contact with compression stop 211 of housing 204. This maximum deflection occurs when a compressive force greater in magnitude than an upper threshold compressive force, e.g., the maximum subset of the aforementioned operation loads, is received by lower mount 200. Therefore, upper link 202 and housing 204 are only "free" to move or "float" with respect to each other, allowing longitudinal deflection of the lugs 218 of upper link 202 relative to and within the center structure 214 of housing 204, and specifically between compression stop 211 and tension stops 210, when a compressive force of a magnitude between the pre-load tensile force and the upper threshold compressive force is received by lower mount 200. The amount or magnitude of this longitudinal deflection is commensurate with the compressive force being received by, or transmitted to, lower mount 200. It is in this "free" or "floating" deflection range wherein lower mount 200 acts as a compliant engine mount to isolate a supporting structure, such as the aircraft structure 3 in FIGS. 1A-1C, from forces, loads, vibrations, and the like coming from a supported structure, such as engine 4 in FIGS. 1A-1C. The foregoing is a non-limiting example.

Fluid elements 220, central plate 224, elastomer sections 226, and inner and outer bonded cylindrical members 223, 222 all operate in a substantially similar manner in lower mount 200 as has been described previously for top mount 100. However, the assembly and method of manufacturing lower mount 200 differs from that of top mount 100. For example, the method of manufacturing includes providing housing 204, sealing inner member 206 and fluid elements 220 to housing 204, providing tension stops 210 on an inner wall of inner cylindrical portion 214, providing flexing element 208 over top of housing 204, forming a seal 216 between a flange of flexing element 208 and housing 204, and inserting upper link 202 such that lugs 218 thereof are below tension stops 210, rotating upper link 202 and/or housing 204 to engage lugs 218 with tension stops 210. Upper and lower spherical bearing 212A, 212B are illustrated as being positioned in outer portions of upper link 202 and housing 204, respectively. However, any connective device capable of transmitting load to the upper link 204 and housing 204 may be used instead of spherical bearings 212A, 212B. Seal 216 may be formed in a plurality of ways known to those having ordinary skill in the relevant art.

In some embodiments, a method of use for an engine mount device in the form of either a top mount 100 or lower mount 200 includes applying a pre-load force to an upper link (e.g., 102 or 202) of engine mount device; coupling upper link to a flexing element (e.g., 108 or 208); and transmitting a load to an upper bearing surface (e.g., 112A or 212A) of the engine mount device. According to this example method, when a load from engine 4 is greater than the pre-load force, the upper link 102, 202 is movable with respect to a housing (e.g., 104 or 204) of the engine mount device along a longitudinal axis of the engine mount device. A movement of the upper link 102, 202 relative to the housing 104, 204 is bounded by a distance between a first position and a second position, and/or the movement of the upper link 102, 202 relative to the housing 104, 204 deforms the flexing element 108, 208 and pumps a fluid into or out of a cavity 134, 234 within the engine mount device to change a volume of a gas-filled space/bladder 128, 129, 228, 229. In some embodiments, the first position can be defined such that the upper link 102, 202 contacts the tension stop 110, 210 when no force is applied, while the second position can be defined such that the upper link 102, 202 contacts the compression stop 111, 211 when the upper link 102, 202 is fully deflected. In other embodiments, the converse can be true, such that the upper link 102, 202 contacts the compression stop 111, 211 when in the first position and contacts the tension stop 110, 210 when fully deflected.

Figure 8:
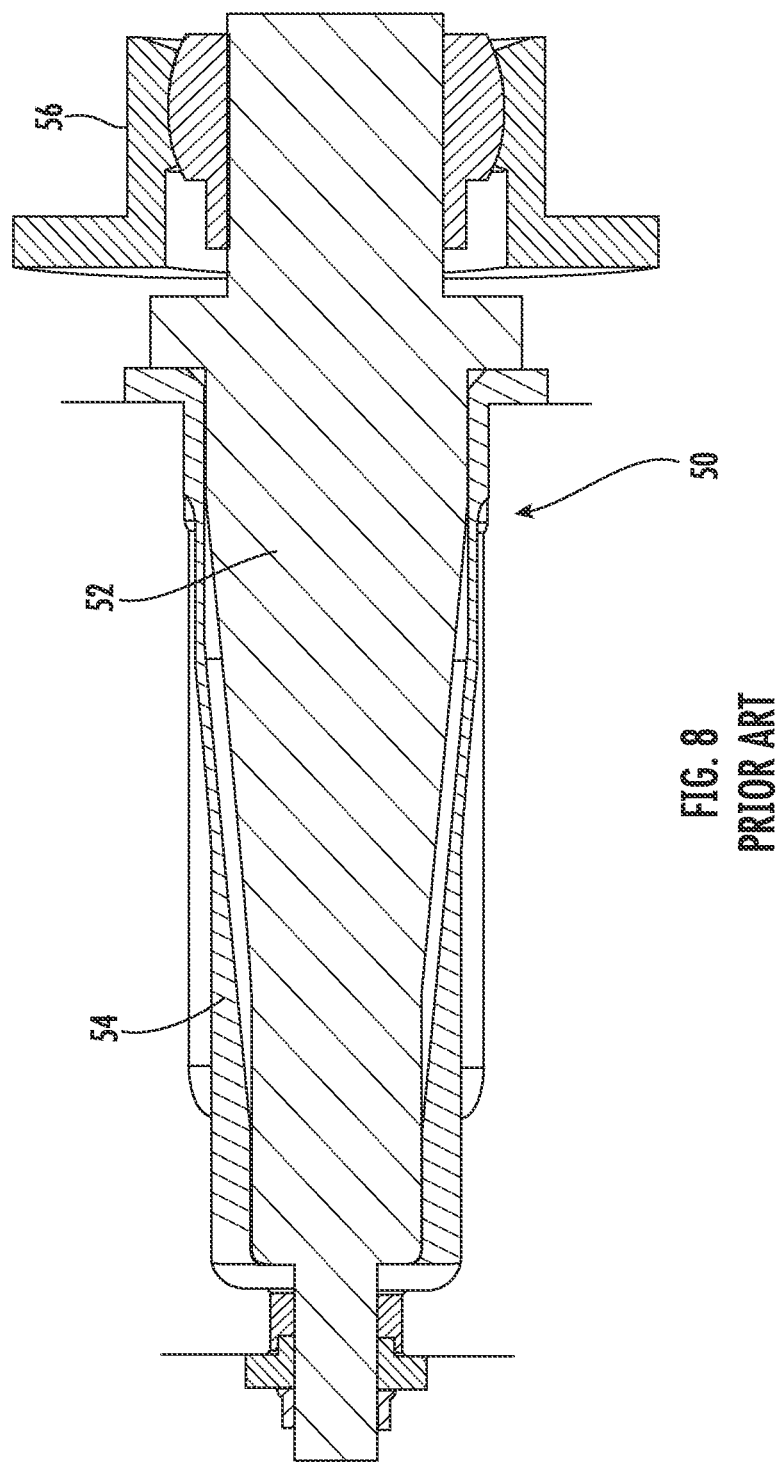
FIG. 8 is a cutaway side view of a conventional center trunnion mount.

Referring to FIGS. 8-12, an example center trunnion mount is illustrated. FIG. 8 is a center trunnion mount 50 of a conventional design, with limited or no capabilities of force or vibrational isolation between aircraft 2 and engine 4. A conventional center trunnion mount 50 design has a rigid pin 52 located inside of a protective sleeve 54, rigid pin 52 being fixedly connected to an engine bearing surface 56. Rigid pin 52 and protective sleeve 54 are by their nature rigid and react forces in the vertical and thrust directions. However, rigid pin 52 is otherwise free to move laterally (e.g., along the bearing surface of engine 4 in the direction of the longitudinal axis) with comparatively minimal force required to induce lateral movement compared to the force required to cause a deflection of rigid pin 52 in either the thrust or vertical directions. As illustrated in FIG. 8, a conventional center trunnion mount 50 having a rigid pin 52 and protective sleeve 54 arrangement will result in a direct contact path thereby resulting in the transfer of forces and vibrations between engine 4 and vehicle structure 2 without any compliant or isolating characteristics.

Figure 9:
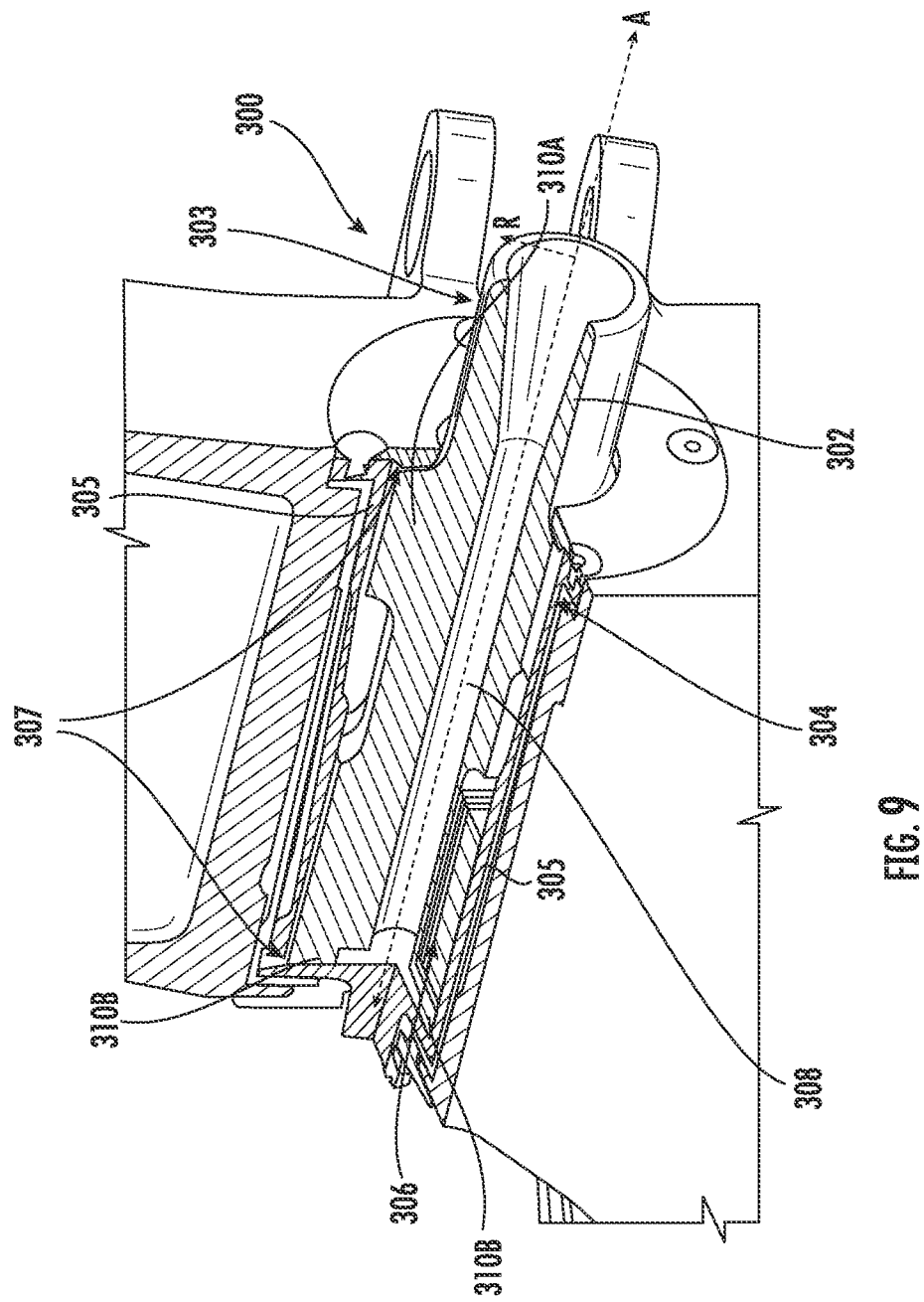
FIG. 9 is a cutaway perspective view of a center trunnion mount according to an embodiment of the presently disclosed subject matter.
Figure 11:
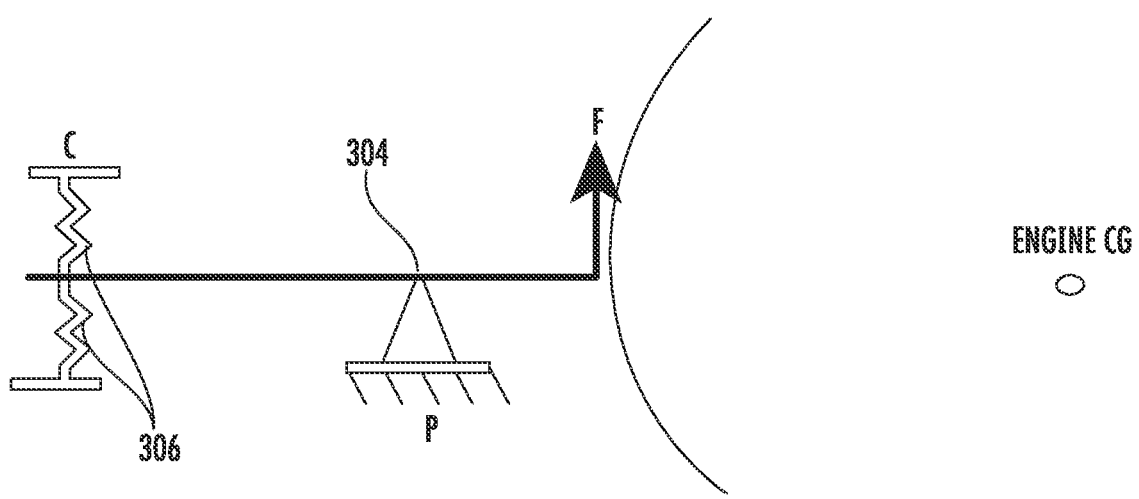
FIG. 11 is a schematic illustration showing the reaction of a center trunnion mount to a vertical force.

Referring to FIGS. 9-10C, a fully contained center trunnion mount according to an example embodiment of the invention, generally designated 300, is provided. As illustrated, the axial direction A is oriented along the length of pin 302 and the radial direction R is perpendicular to the axial direction A. Center trunnion mount 300 has very high stiffness in one or more radial directions R, compared to very soft stiffness in the longitudinal or "axial" direction A. As used herein, very high stiffness is comparable to the stiffness of a hard metallic bearing stiffness (i.e. metallic structure stiffness) and very soft stiffness is comparable to the stiffness of an elastomeric element, which may be 30% of the stiffness of the metallic structure stiffness, which may be 20% of the stiffness of the metallic structure stiffness, or which may be 10% or less of the stiffness of the metallic structure stiffness. Preferably, the very soft stiffness is 20% of the stiffness of the metallic structure stiffness. More preferably, the very soft stiffness is 10% or less of the stiffness of the metallic structure stiffness. Center trunnion mount 300 operates on the principle of a pivoting mechanism to provide vertical compliance by receiving a load through a center pin/bearing configuration on the engine (See, e.g., FIG. 9).

In the embodiment illustrated in FIGS. 9-10C, center trunnion mount 300 comprises a pin 302, an inboard pivot element 304, and an elastomeric compliance element 306. Inboard pivot element 304 is a pivoting metallic-elastomeric flexing element. Inboard pivot element 304 is a very stiff radial elastomeric package, and one of the elements at which the load is being reacted. Inboard pivot element 304 allows for very high fore/aft spring rates, for example, of about 2,500,000 pounds-force per inch (lb/in) (about 3,389,545 Newton meters). Elastomeric compliance element 306 is a lateral/vertical metallic-elastomeric flexing element. Elastomeric compliance element 306 reacts the load and provides compliance characteristics and is located further inboard from pivot member 304 and the center of gravity of the supported structure, for example, engine 4 in FIGS. 1A-1C. Pin 302 has a bore 308, which reduces the mass thereof, and a protruding portion 303 which is received within an engine bearing surface. Compliance in the radial, e.g., vertical and thrust, directions R is provided by the elastomer packages at both pivot element 304 and elastomeric compliance element 306. Both the inboard pivot element 304 and the elastomeric compliance element 306 comprise elastomeric structures that are covered or clad with a metal surface, the metal surface being a contact point of the pin 302 with the inner surface of the housing 305. The inboard pivot element 304 and the elastomeric compliance element 306 provide compliant force and vibration isolation in the lateral direction. In an installed position, the protruding portion of pin 302 is located coaxially within and in contact with an engine bearing surface (not shown) but is free to move laterally within the engine bearing. Lateral movement of pin 302 is restricted by first and second lateral stop members 310A, 310B, respectively. First lateral stop 310A is shown as being two outer radial portions of pin 302 configured to restrict excessive lateral movement of pin 302 in the axial direction A with respect to the aircraft structure 3. Second lateral stop 310B is shown as being an inboard circular protruding portion of pin 302 centered coaxially around bore 308 and disposed radially about an outer surface of pin 302; second lateral stop 310B is configured to restrict excessive inboard movements of pin 302. It is contemplated that first and second lateral stops 310A, 310B may be any suitable size and shape and can include one or a plurality of such members in order to restrict lateral outboard and inboard movement of pin 302, respectively.

In some embodiments, compliance for center trunnion mount 300 is designed to target a narrow range of load conditions to minimize static deflections. As discussed above, first and second lateral stops 310A, 310B are integrated within pin 302 of center trunnion mount 300 to control system motions and carry large gravitational "G" loads. When either of first or second lateral stops 310A, 310B are engaged, center trunnion mount 300 behaves in the same manner as conventional center trunnion mount 50, with minimal or no vibrational or force isolation characteristics. Direct contact of either of first or second lateral stops 310A, 310B effectively "short circuit" the isolating features of center trunnion mount 300 (e.g., the direct contact of either of first or second lateral stops 310A, 310B minimizes the behavior of the compliant elements). Direct contract carries the excessive load through the secondary load path presented by the direct contact first or second lateral stop 310A, 310B to aircraft 2. Carrying the excessive load through the secondary load path rather than through the compliant elements (e.g., pivot element 304 and elastomeric compliance element 306) protects pivot element 304 and elastomeric compliance element 306 from an excessive increase in load or deflection. In some embodiments, first and second lateral stops 310A, 310B are oriented in the axial, or "soft," directions A to account for frictional conditions. Frictional conditions are such as a dynamic condition when engine 4 cannot freely slide on pin 302 due to a static normal load transmitted through the engine bearing. In such a condition, center trunnion mount 300 will reach its deflection snubbing point, at which time it can react enough load to allow the engine 4 to statically slide on the pin until a steady-state load and position is reached. At this point, engine vibration serves to space the pin apart from the first and second lateral stops 310A, 310B, and allows center trunnion mount 300 to once again be dynamically compliant.

Figure 12:
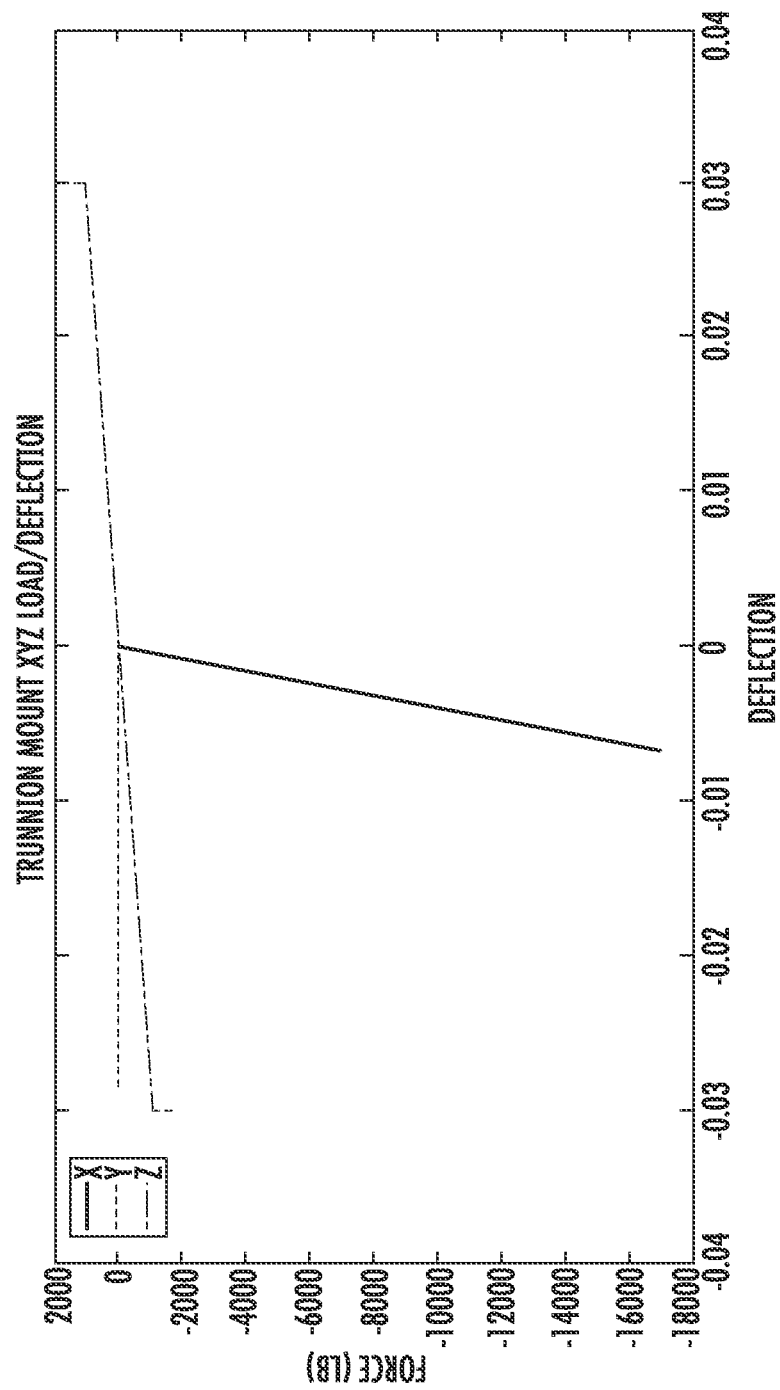
FIG. 12 is a graph of deflection versus force of an example center trunnion mount according to an embodiment of the presently disclosed subject matter.

Pivot element 304 may be non-compliant in some embodiments. FIG. 12 shows a static force versus deflection graph for an example center trunnion mount 300 in the directions along its longitudinal, vertical, and thrust axes. Where the X and Z axes are radial directions and the Y axis is the axial direction. The embodiment illustrated herein is a representative, non-limiting, example embodiment and other embodiments are within the scope of this disclosure.

A method for reacting loads from engine of vehicle to a vehicle structure via central trunnion mount 300 includes providing an engine bearing on the engine 4, the engine bearing having an engine bearing surface. The method includes inserting the pin 302 inside an engine bearing structure of the engine 4 and transmitting a load from engine 4 to pin 302 through a compatible surface of the engine 4. In some embodiments, lateral movement of the pin 302 is bounded in the inboard direction along a longitudinal axis A of pin 302 by a first position, where the first position corresponds to a position where pin 302 makes contact via second lateral stop 310B. In other embodiments, at least first or second lateral stop 310A, 310B is configured to bound a movement of the pin 302 within the housing 305 in an inboard direction, a fore direction, vertical direction, and/or an aft direction. A gap 307 is provided between the housing 305 and the respective first and second lateral stops 310A, 310B. This gap 307 allows for controlled longitudinal movement along the longitudinal axis A of pin 302 and provides for subsequent snubbing movements of the pin 302 within the housing 305. In some embodiments, lateral movement of the pin 302 is bounded in the outboard direction along the longitudinal axis of pin 302 by a second position, where the second position corresponds to a position where pin 302 makes contact via first lateral stop 310B. In some embodiments, when the load acts along a longitudinal axis of pin 302, the pin 302 moves substantially freely along the longitudinal axis of pin 302. In some embodiments, when the load acts transverse to the longitudinal axis of pin 302, the load is reacted by pivot element 304 and elastomeric compliance element 306.

FIGS. 13-16 illustrate an example of an aft mount, generally designated 400, for reacting loads from an engine 4 of an aircraft 2 to an aircraft structure 3. In some embodiments, aft mount 400 is designed to provide a low degree of stiffness in a lateral direction while providing a high degree of stiffness in a vertical direction. Similar to the discussion on the center trunnion mount 300 above, the high degree of stiffness is in the lateral direction, as compared to the very soft stiffness in the vertical direction. As used herein, a high degree of stiffness is comparable to the stiffness of a hard metallic bearing stiffness (i.e. metallic structure stiffness) and low degree of stiffness is comparable to the stiffness of an elastomeric element, which may be 30% of the stiffness of the metallic structure stiffness, which may be 20% of the stiffness of the metallic structure stiffness, or which may be 10% or less of the stiffness of the metallic structure stiffness. Preferably, the very soft stiffness is 20% of the stiffness of the metallic structure stiffness. More preferably, the very soft stiffness is 10% or less of the stiffness of the metallic structure stiffness. In the embodiments illustrated in FIGS. 13-16, aft mount 400 is a pivot-style mount which incorporates stops to prevent excess lateral movement. In some embodiments, fluid elements are included to allow for a tuned inertial fluid effect to further enhance the reduction in force transmission from engine 4 to aircraft 2.

Figure 13:
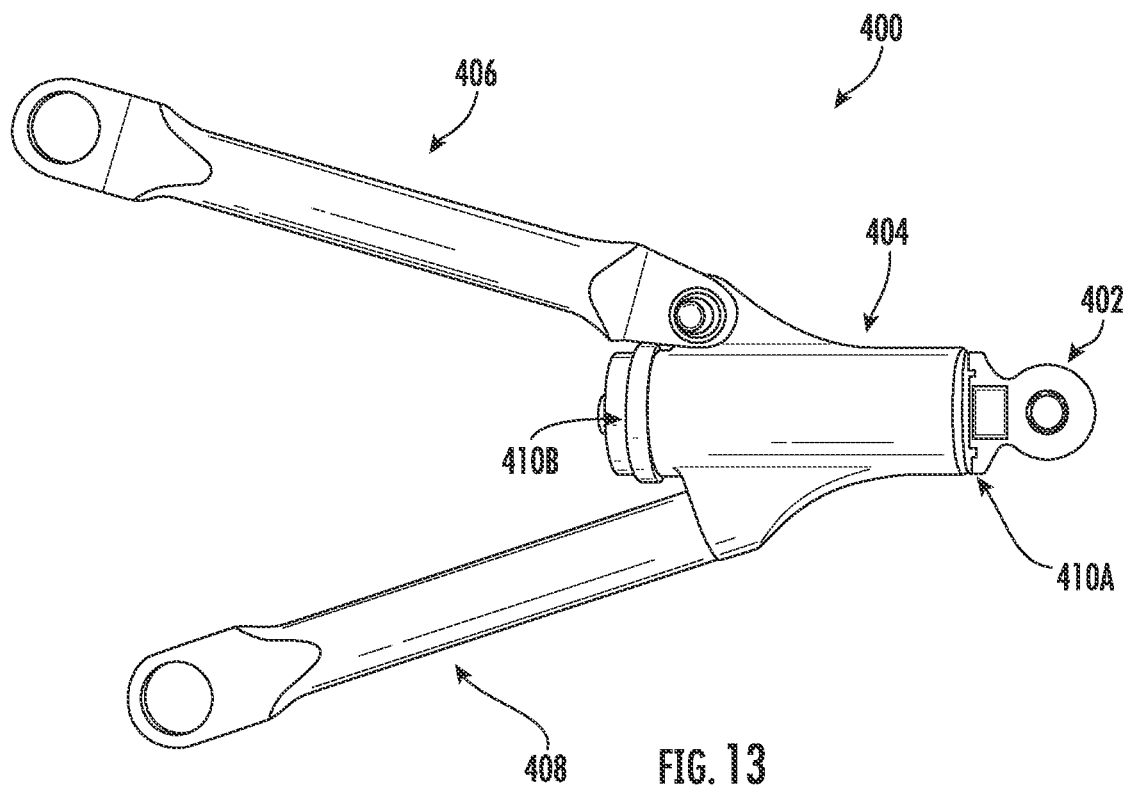
FIG. 13 is a front perspective view of an aft mount assembly according to an embodiment of the presently disclosed subject matter.

In the embodiment shown in FIG. 13, aft mount 400 has inner lug 402, housing 404, upper link 406, lower link 408, and lateral inboard and outboard stops 410A, 410B. Aft mount 400 is connected to engine 4 (not shown in FIG. 13) at inner lug 402 and to aircraft 2 (not shown in FIG. 13) by inboard ends of upper link 406 and lower link 408. Lateral inboard and outboard stops 410A, 410B serve to limit lateral motion (e.g., motion in the inboard and/or outboard directions) induced by lateral forces greater than a predetermined threshold. This allows for aft mount 400 to operate in a compliant manner under normal force transmission conditions. This also allows for aft mount 400 to act as a hard mount when a sufficiently large magnitude lateral force is transmitted to aft mount 400 such as would cause either lateral inboard stop 410A or lateral outboard stop 410B to contact housing 404. The small, restricted travel working zone is an advantage.

Figure 14:
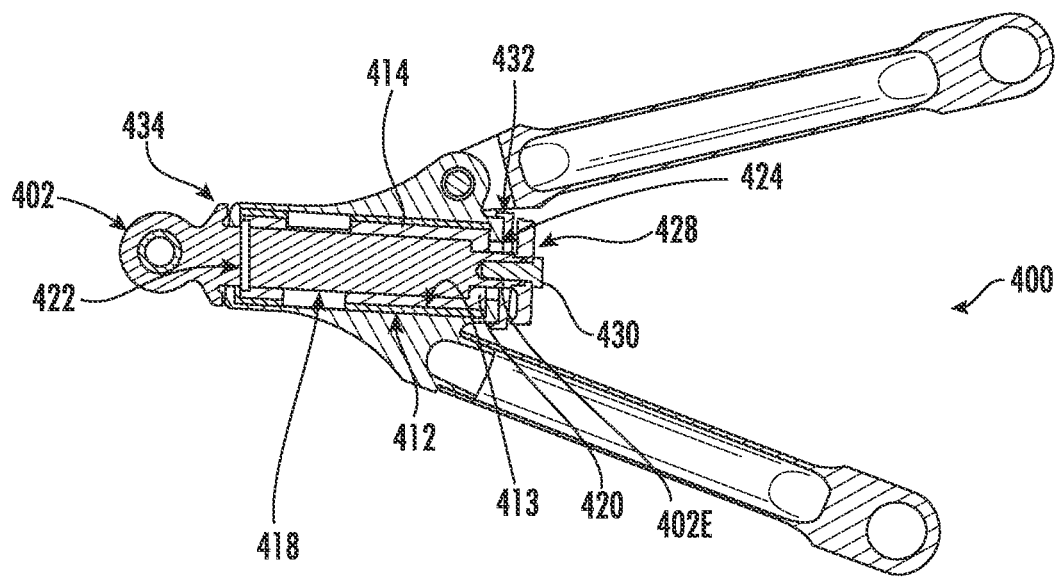
FIG. 14 is a rear sectional view of an aft mount assembly according to an embodiment of the presently disclosed subject matter.

As is shown in FIG. 14, inner lug 402 is at least partially located within housing 404 and interfaces with inner member 414 of inboard elastomer package 412 and outboard elastomer package 422. Vertical loads are reacted vertically at outboard elastomer package 422 and at inboard elastomer package 412, which are designed to have higher controlled stiffness values to restrain vertical motion transfer from a supported structure, for example, engine 4 in FIGS. 1A-1C, into a supporting structure, for example, aircraft structure 3 in FIGS. 1A-1C. The generally tubeform configuration of aft mount 400 provides stiff vertical and comparatively softer lateral elastomeric members. Inboard elastomer package 412 has a high vertical stiffness and a controlled, typically softer, lateral stiffness.

Figure 15:
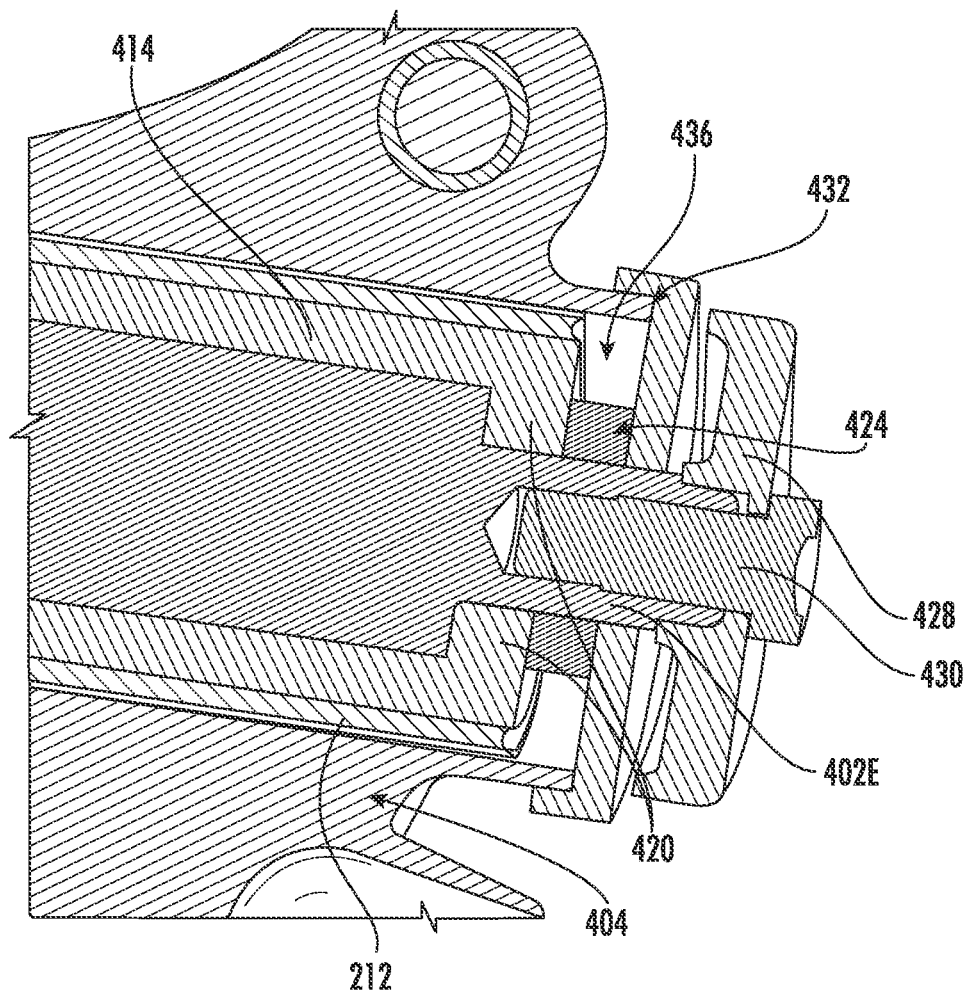
FIG. 15 is a partial cross-sectional view of an aft mount assembly according to an embodiment of the presently disclosed subject matter.

As illustrated in FIGS. 13-16, inboard elastomer package 412 has two substantially tube-form elastomer sections 416A and 416B, each of which are located between an inner wall of housing 404 and inner member 414 of inboard elastomer package 412. Interconnect sleeve 418 connects respective inner members 414 of inboard elastomer package 412 into a single inner member 414. Inner lug 402 is partially disposed within housing 404 and interfaces with inner member 414 of inboard elastomer package 412 along the length thereof. Inner member 414 has an inboard portion which forms a collar 420 thereby creating a hole therethrough. Inboard end of inner lug 402 presses collar 420 and its hole when an inboard lateral force is received by inner lug 402. Inner lug 402 has an extended portion 402E which protrudes beyond collar 420 through its hole, through inboard compression elastomer package 424, and is secured against inboard stop plate 428. FIGS. 14 and 15 illustrate a bolt 430, securing inboard stop plate 428 to inner lug 402 thereby securing inboard compression elastomer package 424 between inboard housing cover 432 and inboard stop plate 428. As those having skill in the art know, any connective device capable of securing inboard stop plate 428 to inner lug 402 will work. During normal operation, lateral loads on inner lug 402 are transmitted to inner member 414 of the inboard elastomer package 412 and reacted, at least in part, through elastomer sections 416A and 416B thereof and into housing 404 in shear, thus providing a lower controlled stiffness.

Extended portion 402E of inner lug 402 has an inner cavity which is threaded for insertion of stop plate retention bolt 430. Stop plate 428 has a hole concentric with the internally threaded extended portion 402E of inner lug 402 through which stop plate retaining bolt 430 engages with the internal threads of inner lug extended portion 402E. Stop plate 428 is configured to contact inboard housing cover 432 when a force in the outboard direction is received by inner lug 402 and inboard compression elastomer package 424 between inboard housing cover 432 and inboard stop plate 428. This action prevents excess outboard motion of inner lug 402 and compression of optional outboard elastomer package 422 which would otherwise result in damage thereto. Inner lug 402 has an outboard stop portion 434 which prevents excess motion in the inboard direction relative to housing 404. Thus, when excess inboard lateral motion of inner lug 402 is induced, outboard stop portion 434 of inner lug 402 contacts housing 404 and prevents further inboard motion of inner lug 402 relative to housing 404. As such, when either stop plate 428 or outboard stop portion 434 contact housing 404, aft mount 400 acts as a hard mount and the compliant characteristics thereof are essentially deactivated until the respective stop no longer contacts housing 404. Outboard stop portion 434 includes, in some embodiments, separate wear plates.

FIGS. 15 and 16 show enlarged views of the interaction between inner lug 402, inner member 414 and inboard elastomer package 412, inboard compression elastomer package 424, and inboard housing cover 432. As was described above, inboard compression elastomer package 424 defines a non-compressed lateral position of inner member 414 and inner lug 402. Inboard housing inner cover 432 sealingly interfaces with housing 404. As before, sealing interface is formed by bonding, using gaskets, using O-rings, press fitting, and other known techniques to ensure a fluid seal between two elements. A sufficient amount of a suitable fluid is located within the interior of housing 404 such that substantially all air is evacuated therefrom when aft mount 400 is fully assembled. As seen in FIGS. 15 and 16, in some embodiments, a fluid cavity 436 is defined by a radial space outside of inboard compression elastomer package 424 and the inner surface 413 of housing 404. When an inboard lateral force is received by inner lug 402 from engine 4, inboard compression elastomer package 424 is compressed and the volume of fluid cavity 436 is decreased. As can be seen in FIG. 16, inner member has a cavity 438 with a gas-filled space/bladder 440, 441 which is in fluid communication with fluid cavity 436 by fluid passage 442, which is located within inner member 414. As such, when inner lug 402 and inner member 414 move laterally, the volume of fluid cavity 436 is reduced and fluid is pumped through fluid passage 442 into cavity 438 which contains gas-filled space/bladder 440, 441, thereby compressing gas-filled space/bladder 440, 441 by the influx of fluid through fluid passage 442. Thus, the gas-filled space/bladder 440, 441 is configured to provide a soft volumetric stiffness to accommodate movement of aft mount 400 and volumetric expansion or contraction of the gas due to temperature. The gas-filled bladder 441 may have, for example, an annular shape. In another embodiment, the gas-filled bladder 441 can be comprised of a plurality of separate or interconnected smaller bladders or balloons that, individually, occupy less than all of the cavity 438. In some embodiments, the properties of the fluid, elastomer sections 416A and 416B, inboard compression elastomer package 424, fluid passages 442, and gas-filled space/bladder 440, 441 are selected to generate a notch in the force transfer function of aft mount 400 over a desired frequency range. This reduction in the transfer function or spring rate reduces the force transmission from a supported structure, such as an engine, into a supporting structure, such as an aircraft structure.

A method for reacting loads from an engine 4 of an aircraft 2, to an aircraft structure 3 includes coupling inner lug 402 to move with inboard elastomer package 412 of an engine mount device, such as aft mount 400; coupling inboard elastomer package 412 to an inner surface 413 of housing 404 of aft mount 400; and transmitting a load to inner lug 402 of aft mount 400. In some embodiments, lateral movement of inner lug 402 and inboard elastomer package 412 relative to housing 404 is bounded by a first position and a second position, the first position corresponding to a position at which outboard stop portion 434 contacts an outboard surface of housing 404 and the second position corresponding to a position at which stop plate 428 contacts inboard housing cover 432. In some embodiments, when the load acts along a longitudinal axis of housing 404, inner lug 402 and inboard elastomer package 412 move laterally and pump a fluid into or out of cavity 438 within the aft mount to change a volume of gas-filled space/bladder 440, 441. In some embodiments, when the load acts transverse to the longitudinal axis of housing 404, the load is reacted by inboard elastomer package 412.

A mounting device for reacting loads from an engine (4) of an aircraft (2) to an aircraft structure (3) along a longitudinal axis of the mounting device is provided herein, the mounting device comprising: an upper link (102, 202) comprising an upper bearing surface (112A, 212A) disposed along the longitudinal axis of the mounting device, along which loading occurs; a housing (104, 204) comprising: a lower bearing surface (112B, 212B) disposed along the longitudinal axis of the mounting device, and a center structure (114, 214) centrally disposed relative to the longitudinal axis, the center structure (114, 214) comprising at least one compression stop (111, 211) configured to carry loads in compression and at least one tension stop (110, 210) configured to carry loads in tension; wherein the upper link (102, 202) is configured to interlock within the center structure (114, 214).

In some embodiments, the mounting device comprising a flexing element (108, 208) connected to the upper link (102, 202) and which contacts the housing (104, 204).

In some embodiments of the mounting device, the upper link (102, 202) is in compression or tension and biased against either the at least one compression stop (111, 211) or the at least one tension stop (110, 210), respectively, in a pre-loaded state from flexing element (108, 208).

In some embodiments, the mounting device comprises fluid elements (120, 220) and a gas-filled space/bladder (128, 228, 129, 229) within a cavity (134, 234) defined within the flexing element (108, 208) and the housing (104, 204).

In some embodiments of the mounting device, upon a movement of the upper link (102, 202) relative to the housing (104, 204), the flexing element (108, 208) is configured to deform and to cause a pumping of fluid into or out of the cavity (134, 234).

In some embodiments of the mounting device, the upper link (102, 202) comprises at least one lug (118, 218) and the center structure (114, 214) comprises at least one slot (116, 216) located between and in a same plane as at least one tension stop (110, 210); the at least one lug (118, 218) is configured to align with the at least one slot (116, 216); and the at least one lug (118, 218) is configured for insertion beyond a plane of the at least one tension stop (110, 210) and rotation such that each lug (118, 218) is substantially aligned with a corresponding tension stop (110, 210).

In some embodiments of the mounting device, when a load greater than a mounting device designed pre-load an operational load envelope is reacted along the longitudinal axis of the mounting device, the upper link (102, 202) is configured to move away from a respective one of the at least one compression stop (111, 211) or tension stop (110, 210) to which the upper link (102, 202) is in compression or tension against by being biased by the flexing element (108, 208) until the upper link (102, 202) contacts the at least one compression stop (111, 211) or tension stop (110, 210) opposite the respective one of the at least one compression stop (111, 211) or one tension stop (110, 210).

In some embodiments of the mounting device, a distance between the compression stop (111, 211) and the at least one tension stop (110, 210) comprises an operational load in which the mounting device operates to reduce noise and vibration of the aircraft (2).

In some embodiments of the mounting device, the operational load corresponds to 1 G±0.5 G and is an operation load resulting from engine thrust at idle up to and including climb levels.

A top mount (100) for reacting tension loads from an engine (4) of an aircraft (2) to an aircraft structure (3) along a longitudinal axis of the top mount (100) is provided, the top mount (100) comprising: an upper link (102) having an upper bearing surface (112A); a housing (104) comprising: a lower bearing surface (112B) disposed along the longitudinal axis of the top mount (100) and a center structure (114) centrally disposed relative to the longitudinal axis of the top mount (100) and comprising a compression stop (111) configured to carry loads in compression and at least one tension stop (110) configured to carry loads in tension, wherein the upper link (102) is configured to interlock within the center structure (114); a flexing element (108) in contact with (e.g., in direct and/or sealing contact with) the housing (104); a fluid which fills, at least partially, a cavity (134) within the flexing element (108) and the housing (104); and an inner member (106) wherein the cavity (134) is formed therein, the cavity (134) having a gas-filled space/bladder (128, 129) therein; wherein loading of the top mount (100) occurs along the longitudinal axis thereof.

In some embodiments of the top mount (100), the upper link (102) is in compression or tension and biased against either the at least one compression stop (111) or the at least one tension stop (110), respectively, in a pre-loaded state from the flexing element (108).

In some embodiments of the top mount (100), the upper link (102) is configured to move away from the compression stop (111) against which the upper link (102) is in compression or tension resulting from flexing element (108) thereby being biased until the upper link (102) contacts the at least one tension stop (110) when a load greater than a mounting device designed pre-load of a total operational tension load is reacted along the longitudinal axis of the top mount (100).

A lower mount (200) for reacting compression loads from an engine of an aircraft (2) to an aircraft structure (3) along a longitudinal axis of the lower mount (200) is provided, the lower mount (200) comprising: an upper link (202) having an upper bearing surface (212A); a housing (204) comprising: a lower bearing surface (212A) disposed along the longitudinal axis of the lower mount (200); a center structure (214) centrally disposed relative to the longitudinal axis of the lower mount (200) and comprising a compression stop (211) configured to carry loads in compression and at least one tension stop (210) configured to carry loads in tension, wherein the upper link (202) is configured to interlock within the center structure (214); a flexing element (208) in contact with (e.g., in direct and/or sealing contact with) the housing (204); a fluid which fills, at least partially, a cavity (234) within the flexing element (208) and the housing (204); and an inner member (206) located within the cavity (234), the cavity (234) having a gas-filled space/bladder (228, 229) therein; wherein loading of the lower mount (200) occurs along the longitudinal axis thereof.

In some embodiments of the lower mount (200), the upper link (202) is in compression or tension and biased against either the at least one compression stop (211) or the at least one tension stop (210), respectively, in a pre-loaded state from the flexing element (208).

In some embodiments of the lower mount (200), the upper link (202) is configured to move away from the at least one tension stop (210) against which the upper link (202) is in compression or tension resulting from flexing element (208) thereby being biased until the upper link (202) contacts the compression stop (211) when a load greater than a mounting device designed pre-load of a total operational compression load is reacted along the longitudinal axis of the lower mount (200).

A center trunnion mount (300) for reacting loads from an engine (4) of an aircraft (2) to aircraft structure (3) is provided, the center trunnion mount (300) comprising: a pin (302) configured to be received within an engine bearing structure of the engine; a pivot element (304) disposed on a surface of the pin (302), the pivot element (304) being configured to react the loads from the engine (4); and an elastomeric compliance element (306) disposed inboard on the pin (302) relative to the pivot element (304).

In some embodiments, the center trunnion mount (300), comprises at least one stop configured to bound a movement of the pin (302) within the housing in an inboard direction, a fore direction, vertical direction, and/or an aft direction.

An aft mount (400) for reacting loads from an engine (4) of an aircraft (2) to an aircraft structure (3) is provided, the aft mount (400) comprising: an inner lug (402); a housing (404); an inboard elastomer package (412) configured to move laterally with the inner lug (402) inside of the housing (404); wherein lateral movement of the inner lug (402) and inboard elastomer package (412) is bounded by a first position and a second position; wherein the inboard elastomer package (412) comprises an inner member (414) configured to form a fluid cavity (436) at an inboard end of the housing (404); wherein the inner member (414) is movable along a longitudinal axis of the housing (404) to modify a volume of the fluid cavity (436); and wherein lateral movement of the inner lug (402) and inboard elastomer package (412) pumps a fluid into or out of the fluid cavity (436) to change a volume of a gas-filled space/bladder (440, 441).

In some embodiments, the aft mount (400) comprises a stop plate (428) located outside of the inboard end of the housing (404); wherein the stop plate (428) is movable laterally along with the inner lug (402); wherein the inner lug (402) comprises an outboard stop portion (434) located outside of an outboard end of the housing (404); and wherein a position of the inner lug (402) is bounded by distances from the housing (404) to the stop plate (428) and the outboard stop portion (434), respectively.

In some embodiments, the aft mount (400) comprises an outboard elastomer package.

A compliant engine mount system for reacting loads from an engine (4) of an aircraft (2) to an aircraft structure (3), the system comprising: a top mount (100), a lower mount (200), and a center trunnion mount (300). The top mount comprises: an upper link (102) comprising at least one lug (118) and an upper bearing surface (112A) disposed along a longitudinal axis of the top mount (100), wherein loading of the top mount (100) occurs along the longitudinal axis of the top mount (100); and a housing (104) comprising: a lower bearing surface (112B) disposed along the longitudinal axis of the top mount (100), and a center structure (114) comprising at least one compression stop (111), which is configured to carry loads in compression, and at least one tension stop (110), which is configured to carry loads in tension, the center structure (114) being centrally disposed relative to the longitudinal axis of the top mount, wherein the upper link (102) is configured to interlock within the center structure (114). The lower mount (200) comprises: an upper link (202) comprising at least one lug (218) and an upper bearing surface (212A) disposed along a longitudinal axis of the lower mount (200), wherein loading of the lower mount (200) occurs along the longitudinal axis of the lower mount (200); and a housing (204) comprising: a lower bearing surface (212B) disposed along the longitudinal axis of the lower mount (200), and a center structure (214) comprising at least one compression stop (211), which is configured to carry loads in compression, and at least one tension stop (210), which is configured to carry loads in tension, the center structure (214) being centrally disposed relative to the longitudinal axis of the lower mount, wherein the upper link (202) is configured to interlock within the center structure (214). The center trunnion mount (300) comprises: a pin (302) configured to be received within an engine bearing structure of the engine (4); a pivot element (304) disposed on a surface of the pin (302), the pivot element (304) being configured to react the loads from the engine (4); and an elastomeric compliance element (306) disposed inboard on the pin (302) relative to the pivot element (304), in a direction opposite a portion of the pin (302) that is configured to be received within the engine bearing structure of the engine (4).

In some embodiments of the compliant engine mount system, the top mount (100) comprises a flexing element (108), which is connected to the upper link (102) and is in contact with (e.g., in direct and/or sealing contact with) the housing (104); and the lower mount (200) comprises a flexing element (208), which is connected to the upper link (202) and is in contact the housing (204).

In some embodiments of the compliant engine mount system, the flexing element (108) of the top mount (100) is configured to exert a compression pre-load force on the upper link (102), such that the at least one lug (118) of the upper link (102) is biased in compression against, and in contact with, the at least one compression stop (111) unless a tension force greater than the compression pre-load force is transmitted to the top mount (100); and the flexing element (208) of the lower mount (200) is configured to exert a tension pre-load force on the upper link (202), such that the at least one lug (218) of the upper link (202) is biased in tension against, and in contact with, the at least one tension stop (210) unless a compression force greater than the tension pre-load force is transmitted to the lower mount (200).

In some embodiments of the compliant engine mount system, the upper link (102) of the top mount is configured for displacement relative to the housing (104) along the longitudinal axis of the top mount (100), such that the at least one lug (118) is spaced apart from the at least one compression stop (111) when a tension force greater than the compression pre-load force is transmitted to the top mount (100); and the upper link (202) of the lower mount is configured for displacement relative to the housing (204) along the longitudinal axis of the lower mount (200), such that the at least one lug (218) is spaced apart from the at least one tension stop (210) when a compression force greater than the tension pre-load force is transmitted to the lower mount (200).

In some embodiments of the compliant engine mount system, when a tension force equal to or greater than a tension snubbing threshold is transmitted to the top mount (100), the upper link (102) of the top mount (100) is configured to move to a position of maximum displacement, such that the at least one lug (118) is in contact with, and in tension against, the at least one tension stop (110); and, when a compression force equal to or greater than a compression snubbing threshold is transmitted to the lower mount (200), the upper link (202) of the lower mount (200) is configured to move to a position of maximum displacement, such that the at least one lug (218) is in contact with, and in compression against, the at least one compression stop (211).

In some embodiments of the compliant engine mount system, when a tension force between the tension snubbing threshold and the compression pre-load force is transmitted to the top mount (100), the upper link (102) of the top mount (100) is configured for displacement along the longitudinal axis, such that the at least one lug (118) of the upper link (102) is between, and spaced apart from, the at least one compression stop (111) and the at least one tension stop (110) along the longitudinal axis of the top mount (100), a distance of the at least one lug (118) from the at least one compression stop (111) varying proportionally according to a magnitude of the tension force transmitted to the top mount (100); and when a compression force between the compression snubbing threshold and the tension pre-load force is transmitted to the lower mount (200), the upper link (202) of the lower mount (200) is configured for displacement along the longitudinal axis, such that the at least one lug (218) of the upper link (202) is between, and spaced apart from, the at least one compression stop (211) and the at least one tension stop (210) along the longitudinal axis of the lower mount (200), a distance of the at least one lug (218) from the at least one tension stop (210) varying proportionally according to a magnitude of the compression force transmitted to the lower mount (200).

In some embodiments of the compliant engine mount system, for the top mount (100), the tension force between the tension snubbing threshold and the compression pre-load force is defined by a first operational load envelope, in which the top mount (100) is configured to provide damping between the engine (4) and the aircraft (2) by reducing transmission of noise and vibration to the aircraft (2); and, for the lower mount (200), the compression force between the compression snubbing threshold and the tension pre-load force is defined by a second operational load envelope, in which the lower mount (200) is configured to provide damping between the engine (4) and the aircraft (2) by reducing transmission of noise and vibration to the aircraft (2).

In some embodiments of the compliant engine mount system, the first and second operational load envelopes correspond to 1 G±0.5 G and each include an operation load resulting from thrust of the engine at idle up to and including climb levels.

In some embodiments of the compliant engine mount system, the top mount (100) and/or the lower mount (200) comprise an inner member (106, 206); a fluid that fills, at least partially, a cavity (134, 234) formed by the housing (104, 204) and the inner member (106, 206); and a gas-filled space/bladder (128, 228, 129, 229) within a portion of the cavity (134, 234) within the inner member (106, 206).

In some embodiments of the compliant engine mount system, whichever of the top mount (100) and/or the lower mount (200) that comprises the inner member (106, 206), the fluid, and the gas-filled space/bladder (128, 228, 129, 229) is configured such that the fluid is pumped into or out of the cavity (134, 234) through a fluid passage (132, 232) formed in the inner member (106, 206) when the upper link (102, 202) moves relative to the housing (104, 204).

In some embodiments of the compliant engine mount system, for the top mount (100) and/or the lower mount (200), the center structure (114, 214) comprises at least one slot (116, 216) through a thickness of, and in a same plane as, the at least one tension stop (110, 210), the at least one lug (118, 218) is configured to align with the at least one slot (116, 216), and the at least one lug (118, 218) is configured for insertion beyond a place of the at least one tension stop (110, 210) and rotation such that each lug (118, 218) is substantially aligned with a corresponding tension stop (110, 210).

In some embodiments, the compliant engine mount system comprises an aft mount (400) comprising: an inner lug (402); and an inboard elastomer package (412) configured to move laterally with the inner lug (402) inside of a housing (404); wherein lateral movement of the inner lug (402) and inboard elastomer package (412) is bounded by a first position and a second position; wherein the inboard elastomer package (412) comprises an inner member (414) configured to form a fluid cavity (436) at an inboard end of the housing (404); wherein the inner member (414) is movable along a longitudinal axis of the housing (404) to modify a volume of the fluid cavity (436); and wherein lateral movement of the inner lug (402) and inboard elastomer package (412) pumps a fluid into or out of the fluid cavity (436) to change a volume of a gas-filled space/bladder (440, 441).

A method for reacting loads from an engine (4) of an aircraft (2) to an aircraft structure (3) is provided, the method comprising: coupling an upper link (102, 202) of an engine mount device (100, 200) to a flexing element (108, 208); applying a pre-load force to the upper link (102, 202) via the flexing element (108, 208); and transmitting a load from the engine (4) to a bearing surface on the upper link (102, 202) and/or a housing (104, 204) of the engine mount device (100, 200); wherein, when the load from the engine (4) is greater than the pre-load force, the upper link (102, 202) is movable with respect to the housing (104, 204) of the engine mount device (100, 200) along a longitudinal axis of the engine mount device (100, 200); wherein a movement of the upper link (102, 202) relative to the housing (104, 204) is bounded by a distance between a first position, defined by a contact surface between a lug (118, 218) of the upper link (102, 202) and a tension stop (110, 210) of the housing (104, 204), and a second position, defined by a contact surface between the lug (118, 218) of the upper link (102, 202) and a compression stop (111, 211) of the housing (104, 204); and wherein the movement of the upper link (102, 202) relative to the housing (104, 204) deforms the flexing element (108, 208) and pumps a fluid into or out of, depending on whether the upper link (102, 202) is moving towards or away from, respectively, the housing (104, 204), a cavity (134, 234) within the engine mount device to change a volume of a gas-filled space/bladder (128, 228, 129, 229).

A method for reacting loads from an engine (4) of an aircraft (4) to an aircraft structure (3) is provided, the method comprising: coupling an inner lug (402) to move with an inboard elastomer package (412) of an engine mount device; coupling the inboard elastomer package (412) to an inner surface (413) of a housing (404) of the engine mount device; and transmitting a load to the inner lug (402) of the engine mount device; wherein lateral movement of the inner lug (402) and the inboard elastomer package (412) relative to the housing (404) is bounded by a first position and a second position; wherein, when the load acts along a longitudinal axis of the housing (404), the inner lug (402) and the inboard elastomer package (412) move laterally and pump a fluid into or out of a fluid cavity (436) within the engine mount device to change a volume of a gas-filled space/bladder (440, 441); and wherein, when the load acts transverse to the longitudinal axis of the housing (404), the load is reacted by the inboard elastomer package (412).

A method for reacting loads from an engine (4) of an aircraft (2) to an aircraft structure (3) is provided, the method comprising: providing an engine bearing on the engine (4), the engine bearing having an engine bearing surface (56); inserting a pin (302) at least partially within the engine bearing; and transmitting a load from the engine (4) to the pin (302) at the engine bearing surface (56); wherein lateral movement of the pin (302) is bounded in an inboard direction along a longitudinal axis of the housing by a first position; wherein, when the load acts along a longitudinal axis of the pin (302), the pin (302) moves substantially freely along the longitudinal axis of the housing; and wherein, when the load acts transverse to the longitudinal axis of the pin (302), the load is reacted by a pivot element (304) and an elastomeric compliance element.

A method for limiting the deflection of an engine (4) mechanically to an aircraft structure (3) of an aircraft (2) is provided, the method comprising: providing a mounting device comprising at least an upper link (102, 202), which comprises at least one lug (118, 218), and a housing (104, 204), which has a center structure (114, 214) comprising at least one compression stop (111, 211), which carries loads in compression, and at least one tension stop (110, 210), which carries loads in tension; interlocking the at least one lug (118, 218) within the center structure (114, 214) of the housing (104, 204); coupling the upper link (102, 202) to the housing (104, 204) using a flexing element (108, 208), which is in contact with (e.g., in direct and/or sealing contact with) the housing (104, 204) in a fluid-tight manner; applying, using the flexing element (108, 208), a pre-load force to the upper link (102, 202) to bias the at least one lug (118, 218) against and in contact with either the at least one compression stop (111, 211) or the at least one tension stop (110, 210); attaching the engine (4) of the aircraft (2) to an upper bearing surface (112A, 212A) of the upper link (102, 202) or a lower bearing surface (112B, 212B) of the housing (104, 204); and transmitting a load from the engine (4) to whichever of the upper bearing surface (112A, 212A) and the lower bearing surface (112B, 212B) the engine (4) is attached; wherein, when the load from the engine (4) is greater than the pre-load force, the upper link (102, 202) is movable relative to the housing (104, 204) along a longitudinal axis of the mounting device (100, 200), a distance over which the upper link (102, 202) is movable relative to the housing (104, 204) being defined by a distance between surfaces where the at least one lug (118, 218) can contact the at least one compression stop (111, 211) and the at least one tension stop (110, 210).

In some embodiments, the method comprises: filling, at least partially, a cavity (134, 234) formed by the housing (104, 204) and an inner member (106, 206) with a fluid; positioning a gas-filled space/bladder (128, 228, 129, 229) within a portion of the cavity (134, 234) within the inner member (106, 206); and pumping, when the upper link (102, 202) moves relative to the housing (104, 204), the fluid into or out of the cavity (134, 234) through a fluid passage (132, 232) formed in the inner member (106, 206) to change a volume of the gas-filled space/bladder (128, 228, 129, 229).

A method for limiting the deflection of an engine (4) mechanically connected to an aircraft structure (3) of an aircraft (2), the method comprising: providing a mounting device (100, 200) comprising: an upper link (102, 202) comprising at least one lug (118, 218) and an upper bearing surface (112A, 212A) disposed along a longitudinal axis of the mounting device (100, 200), wherein loading occurs along the longitudinal axis of the mounting device (100, 200); and a housing (104, 204) comprising: a lower bearing surface (112B, 212B) disposed along the longitudinal axis of the mounting device (100, 200); and a center structure (114, 214) comprising at least one compression stop (111, 211), which carries loads in compression, and at least one tension stop (110, 210), which carries loads in tension, the center structure (114, 214) being centrally disposed relative to the longitudinal axis; wherein the upper link (102, 202) is configured to interlock within the center structure (114, 214); and reacting an operational load from the engine (4) with the mounting device (100, 200).

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

The invention claimed is:

1. A compliant engine mount system for reacting loads from an engine of an aircraft to an aircraft structure, the system comprising:
   a top mount comprising:
      an upper link comprising an upper bearing surface;
      a housing comprising;
         a lower bearing surface disposed along the longitudinal axis of the top mount;
         a center structure centrally disposed relative to the longitudinal axis of the top mount and comprising a compression stop configured to carry loads in compression and at least one tension stop configured to carry loads in tension;
         wherein the upper link is configured to interlock within the center structure;
   a lower mount comprising:
      an upper link comprising an upper bearing surface;
      a housing comprising:
         a lower bearing surface disposed along the longitudinal axis of the lower mount;
         a center structure centrally disposed relative to the longitudinal axis of the lower mount and comprising a compression stop configured to carry loads in compression and at least one tension stop configured to carry loads in tension;
         wherein the upper link is configured to interlock within the center structure; and
   a center trunnion mount comprising:

a pin configured to be received within an engine bearing structure of the engine;

a pivot element disposed on a surface of the pin, the pivot element being configured to react the loads from the engine; and an elastomeric compliance element disposed inboard on the pin relative to the pivot element.

2. The compliant engine mount system of claim 1, wherein the top mount comprises:

a flexing element in sealing contact with the housing;

a fluid which fills, at least partially, a cavity within the flexing element and the housing; and an inner member located within the cavity, the cavity having a gas-filled space/bladder therein;

wherein loading of the top mount occurs along the longitudinal axis thereof.

3. The compliant engine mount system of claim 1, wherein the lower mount comprises:

a flexing element in sealing contact with the housing;

a fluid which fills, at least partially, a cavity within the flexing element and the housing; and an inner member located within the cavity, the cavity having a gas-filled space/bladder therein;

wherein loading of the top mount occurs along the longitudinal axis thereof.

4. The compliant engine mount system of claim 1, wherein the upper link of the top mount is in compression or tension resulting from flexing element being biased against either the at least one compression stop or the at least one tension stop in a pre-loaded state.

5. The compliant engine mount system of claim 1, wherein the upper link of the lower mount is in compression or tension resulting from flexing element being biased against either the at least one compression stop or the at least one tension stop in a pre-loaded state.

6. The compliant engine mount system of claim 1, wherein the center trunnion comprises at least one stop configured to bound a movement of the pin within the housing in an inboard direction, a fore direction, vertical direction, and/or an aft direction.

7. The compliant engine mount system of claim 1, the system further comprising:

an aft mount comprising:

an inner lug; and an inboard elastomer package configured to move laterally with the inner lug inside of a housing;

wherein lateral movement of the inner lug and inboard elastomer package is bounded by a first position and a second position;

wherein the inboard elastomer package comprises an inner member configured to form a fluid cavity at an inboard end of the housing;

wherein the inner member is movable along a longitudinal axis of the housing to modify a volume of the fluid cavity; and wherein lateral movement of the inner lug and inboard elastomer package pumps a fluid into or out of the fluid cavity to change a volume of a gas-filled space/bladder.

8. The compliant engine mount system of claim 7, wherein:

the aft mount comprises a stop plate located outside of the inboard end of the housing;

the stop plate is movable laterally along with the inner lug;

the inner lug comprises an outboard stop portion located outside of an outboard end of the housing; and a position of the inner lug is bounded by distances from the housing to the stop plate and the outboard stop portion, respectively.

9. The compliant engine mount system of claim 7, wherein the aft mount comprises an outboard elastomer package.

10. A method for reacting loads from an engine of an aircraft to an aircraft structure, the method comprising:

providing a top mount comprising:

an upper link comprising an upper bearing surface;

a housing comprising;

a lower bearing surface disposed along the longitudinal axis of the top mount; and a center structure centrally disposed relative to the longitudinal axis of the top mount and comprising a compression stop for carrying loads in compression and at least one tension stop for carrying loads in tension;

interlocking the upper link within the center structure;

providing a lower mount comprising:

an upper link comprising an upper bearing surface;

a housing comprising:

a lower bearing surface disposed along the longitudinal axis of the lower mount; and a center structure centrally disposed relative to the longitudinal axis of the lower mount and comprising a compression stop for carrying loads in compression and at least one tension stop for carrying loads in tension;

interlocking the upper link within the center structure;

providing a center trunnion mount comprising:

a pin arranged within an engine bearing structure of the engine;

a pivot element disposed on a surface of the pin;

an elastomeric compliance element disposed inboard on the pin relative to the pivot element;

transmitting a load from the engine to the top mount, the lower mount, and/or the center trunnion; and reacting the load from the engine with the top mount, the lower mount, and/or the center trunnion.

11. The method according to claim 10, wherein:

lateral movement of the pin is bounded in an inboard direction along a longitudinal axis of the housing by a first position;

when the load acts along a longitudinal axis of the pin, the pin moves substantially freely along the longitudinal axis of the housing; and when the load acts transverse to the longitudinal axis of the pin, the load is reacted by a pivot element and an elastomeric compliance element.

12. The method of claim 10, wherein the top mount comprises:

a flexing element in sealing contact with the housing;

a fluid which fills, at least partially, a cavity within the flexing element and the housing; and an inner member located within the cavity, the cavity having a gas-filled space/bladder therein;

wherein the load is transmitted to the top mount and acts along the longitudinal axis thereof.

13. The method of claim 10, wherein the lower mount comprises:

a flexing element in sealing contact with the housing;

a fluid which fills, at least partially, a cavity within the flexing element and the housing; and an inner member located within the cavity, the cavity having a gas-filled space/bladder therein;

wherein the load is transmitted to the lower mount and acts along the longitudinal axis thereof.

14. The method of claim 10, wherein the upper link of the top mount is in compression or tension resulting from flexing element being biased against either the at least one compression stop or the at least one tension stop in a pre-loaded state.

15. The method of claim 10, wherein the upper link of the lower mount is in compression or tension resulting from flexing element being biased against either the at least one compression stop or the at least one tension stop in a pre-loaded state.

16. The method of claim 10, wherein the center trunnion mount comprises at least one stop, the method comprising using the at least one stop for bounding a movement of the pin within the housing in an inboard direction, a fore direction, vertical direction, and/or an aft direction.

17. The method of claim 10, comprising:
providing an aft mount comprising:
   an inner lug; and
   an inboard elastomer package that is movable laterally with the inner lug inside of a housing;
   wherein lateral movement of the inner lug and inboard elastomer package is bounded by a first position and a second position;
   wherein the inboard elastomer package comprises an inner member forms a fluid cavity at an inboard end of the housing;
   wherein the inner member is movable along a longitudinal axis of the housing to modify a volume of the fluid cavity; and
   wherein lateral movement of the inner lug and inboard elastomer package pumps a fluid into or out of the fluid cavity to change a volume of a gas-filled space/bladder; and
transmitting a load from the engine to the aft mount; and
reacting the load from the engine with the aft mount;
wherein, when the load acts along a longitudinal axis of the housing, the inner lug and the inboard elastomer package move laterally and pump a fluid into or out of a fluid cavity within the engine mount device to change a volume of a gas-filled space/bladder; and
wherein, when the load acts transverse to the longitudinal axis of the housing, the load is reacted by the inboard elastomer package.

18. The method of claim 17, wherein:
the aft mount comprises a stop plate located outside of the inboard end of the housing;
the stop plate is movable laterally along with the inner lug;
the inner lug comprises an outboard stop portion located outside of an outboard end of the housing; and
a position of the inner lug is bounded by distances from the housing to the stop plate and the outboard stop portion, respectively.

19. The method of claim 17, wherein the aft mount comprises an outboard elastomer package.

* * * * *